US010391530B2

(12) United States Patent
Kim et al.

(10) Patent No.: US 10,391,530 B2
(45) Date of Patent: Aug. 27, 2019

(54) LIQUID-REPELLENT SURFACES MADE OF ANY MATERIALS

(71) Applicant: THE REGENTS OF THE UNIVERSITY OF CALIFORNIA, Oakland, CA (US)

(72) Inventors: Chang-Jin Kim, Beverly Hills, CA (US); Tingyi Liu, Los Angeles, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 399 days.

(21) Appl. No.: 15/023,621

(22) PCT Filed: Sep. 26, 2014

(86) PCT No.: PCT/US2014/057797
§ 371 (c)(1),
(2) Date: Mar. 21, 2016

(87) PCT Pub. No.: WO2015/048504
PCT Pub. Date: Apr. 2, 2015

(65) Prior Publication Data

US 2016/0207083 A1 Jul. 21, 2016

Related U.S. Application Data

(60) Provisional application No. 61/883,862, filed on Sep. 27, 2013.

(51) Int. Cl.
*B32B 33/00* (2006.01)
*B08B 17/06* (2006.01)
(Continued)

(52) U.S. Cl.
CPC ............ *B08B 17/065* (2013.01); *B05D 3/107* (2013.01); *B05D 5/00* (2013.01); *B05D 5/08* (2013.01)

(58) Field of Classification Search
CPC ...... B08B 17/065; F28F 13/185; F28F 13/187
See application file for complete search history.

(56) References Cited

U.S. PATENT DOCUMENTS 5,306,946 A 4/1994 Yamamoto
2002/0014403 A1 2/2002 Hoshino
(Continued)

FOREIGN PATENT DOCUMENTS

WO 2009/009185 A2 1/2009
WO 2011/159699 A2 12/2011
(Continued)

OTHER PUBLICATIONS

Tuteja, Anish et al., Robust omniphobic surfaces, PNAS, Nov. 25, 2008, vol. 105, No. 47, 18200-18205, www.pnas.org/cgi/doi/10.1073/pnas.0804872105.
(Continued)

*Primary Examiner* — Laura A Auer
(74) *Attorney, Agent, or Firm* — Vista IP Law Group LLP

(57) ABSTRACT

An artificial surface is disclosed where super-repellency is obtained solely from surface roughness regardless of the material's intrinsic wettability. The surface is able to repel all known liquids. The surface contains thereon a plurality of microstructures having a doubly re-entrant topology and a liquid-solid contact fraction of less than 50%. In one embodiment, the doubly re-entrant topology includes a cap portion and downwardly extending lip extending from the periphery of the cap portion. The surface withstands high temperatures and resists surface changing phenomenon such as biofouling and chemical scaling.

18 Claims, 23 Drawing Sheets

(51) Int. Cl.
*B05D 3/10* (2006.01)
*B05D 5/00* (2006.01)
*B05D 5/08* (2006.01)

(56) References Cited

U.S. PATENT DOCUMENTS

| | | | | |
|---|---|---|---|---|
| 2003/0044569 | A1* | 3/2003 | Kacher | A47L 13/16 428/100 |
| 2007/0028588 | A1* | 2/2007 | Varanasi | F28F 13/187 60/39.5 |
| 2011/0229667 | A1 | 9/2011 | Jin et al. | |
| 2011/0287217 | A1 | 11/2011 | Mazumder et al. | |
| 2014/0015900 | A1 | 1/2014 | Zhang et al. | |

FOREIGN PATENT DOCUMENTS

| | | | |
|---|---|---|---|
| WO | 2012/100100 | A2 | 7/2012 |
| WO | 2013/188958 | A1 | 12/2013 |
| WO | 2014/012039 | A1 | 1/2014 |

OTHER PUBLICATIONS

PCT International Preliminary Report on Patentability (Chapter I of the Patent Cooperation Treaty) for PCT/US2014/057797, Applicant: The Regents of the University of California, Form PCT/IB/326 and 373, dated Apr. 7, 2016 (7pages).
Liu, Tingyi et al., Microstructured SIO2, Surface Repellant to Liquids without Coating, Transducer 2013, Barcelona, Spain, Jun. 16-20, 2013, 1609-1612.
PCT International Search Report for PCT/US2014/057797, Applicant: The Regents of the University of California, Form PCT/ISA/210 and 220, dated Feb. 19, 2015 (6pages).
PCT Written Opinion of the International Search Authority for PCT/US2014/057797, Applicant: The Regents of the University of California, Form PCT/ISA/237, dated Feb. 19, 2015 (5pages).
Barthlott, W. et al., Purity of the sacred lotus, or escape from contamination in biological surfaces, Planta (1997) 202:1-8.
Carey, Van P., Liquid-vapor phase-change phenomena, an introduction to the thermophysics of vaporization and condensation processes in heat transfer an introduction to the thermophysics of vaporization and condensation processes in heat transfer equipment, 8.4 Enhancement of Pool Boiling Heat Transfer, Aspect of Boiling and Evaporation, 326-331, Published 1992 by Hemisphere Pub. Corp. in Washington, D.C., Written in English.
Choi, Chang-Hwan et al., Large Slip of Aqueous Liquid Flow over a Nanoengineered Superhydrophobic Surface, Phys. Rev. Lett. 96, 066001 (2006).
Kim, C.J., Thesis, 1985 (119pages).
Tuteja, Anish et al., Robust omniphobic surfaces, PNAS, 105, 47, (Nov. 25, 2008), 18200-18205.
Grigoryev, Anton et al., Superomniphobic Magnetic Microtextures with Remote Wetting Control, J. Am. Chem. Soc. 2012, 134, 12916-12919.
Guo, Zhiguang et al., Superhydrophobic surfaces: From natural to biomimetic to functional, J. Colloid Interface Science 353 (2011) 335-355.
Kota, Arun K. et al., Hierarchically Structured Superoleophobic Surfaces with Ultralow Contact Angle Hysteresis, Adv. Mater. 2012, 24, 5838-5843.
Onda, T. et al., Super-Water-Repellent Fractal Surfaces, Langmuir 12, 9, 2125-2127 (1996).
Pan, Shuaijun et al., Superomniphobic Surfaces for Effective Chemical Shielding, J. Am. Chem. Soc. 2013, 135, 578-581.
Quere, David, Wetting and Roughness, Annu. Rev. Mater. Res. 2008, 38:71-99.
Tuteja, Anish et al., Designing Superoleophobic Surfaces, Science, 318, 1618-1622 (2007).
Wong, Tak-Sing et al., Bioinspired self-reparing slippery surfaces with pressure-stable omniphobicity, Nature, 477, 443-447 (2011).
Liu, Tingyi "Leo" et al., Turning a surface superrepellent even to completely wetting liquids (and Supplementary Materials), sciencemag.org, Science, Nov. 28, 2014, vol. 346, Issue 6213 (31pages).

* cited by examiner

LIQUID-REPELLENT SURFACES MADE OF ANY MATERIALS

RELATED APPLICATION

This Application is a U.S. National Stage filing under 35 U.S.C. § 371 of PCT Patent Application No. PCT/US2014/057797, filed Sep. 26, 2014, which claims priority to U.S. Provisional Patent Application No. 61/883,862 filed on Sep. 27, 2013. The contents of the aforementioned applications are incorporated by reference herein. Priority is expressly claimed in accordance with 35 U.S.C. §§ 119, 120, 365 and 371 and any other applicable statutes.

FIELD OF THE INVENTION

The field of the invention generally relates to solid surfaces that repel liquid substances.

BACKGROUND

Inspired by natural surfaces such as lotus leaves and Nepenthes pitcher plants, researchers developed two kinds of artificial surfaces to repel liquids much more strongly than conventionally expected. Water-repellent surfaces were made by combining a simple microscale roughness to a hydrophobic material so that water beads up into near-spherical droplets, which roll on or even bouncing off the surface. This type of common superhydrophobic surface can be represented by a simple surface structure shown, for example, in FIG. 1A. To repel liquids that are more difficult to repel, such as oils and organic solvents, an overhanging microstructure (a.k.a. re-entrant topology) is additionally needed so that liquids can be suspended on top of the microstructures by upward-pointing surface tension. This type of superhydrophobic surface can be represented by a surface structure shown in FIG. 1B. However, such an approach is not effective if the liquid is a fluorinated solvent with surface tension smaller than 15 mN/m. See Grigoryev et al., Superomniphobic Magnetic Microtextures with Remote Wetting Control, J. Am. Chem. Soc. 134, 12916-12919 (2012). This is because fluorinated solvents wet all existing materials (including polytetrafluoroethylene) so strongly, e.g., Young's angle (i.e., the intrinsic contact angle of a liquid on a smooth solid surface) is smaller than 10° (i.e., $\theta_Y$<10°) even on polytetrafluoroethylene, that even an overhanging structure could not provide enough suspension force and consequently fails to prevent the liquid from wetting into the microstructures, making the entire surface even more wetting.

Mimicking of Nepenthes pitcher plants, on the other hand, led to a slippery liquid-infused porous surface (SLIPS), where a liquid is repelled by a thin layer of lubricating liquid infused on the porous surface. International Publication No. WO 2012/100100 illustrates one type of SLIPS structure. Limited by the working mechanism, however, SLIPS can only repel liquids that are immiscible to the lubricating liquid and have larger surface tension than the lubricating fluid. Therefore, using one of the fluorinated solvents (e.g., 3M™ FC-70) as the lubricating liquid, SLIPS provides stable repellency to aqueous and hydrocarbon liquids. However, SLIPS fails to repel other fluorinated solvents because neither the immiscibility nor the surface tension criteria is fulfilled.

SUMMARY

In one embodiment, a liquid-repellent artificial surface includes a surface containing thereon a plurality of microstructures separated by a pitch of less than 500 μm and having a doubly re-entrant topology situated atop respective base structures and a liquid-solid contact fraction ($f_s$) of less than 50%, wherein the doubly re-entrant topology comprises a cap portion and downwardly extending lip extending from a periphery of the cap portion. The downwardly extending lip, in one aspect, has a thickness adjacent to a tip of the lip of less than 10% of the width of the cap portion and a length less than 10% of the width of the cap portion. In another aspect, the downwardly extending lip is angled (α) with respect to a plane of the surface within the range of −30° to −180°.

In another embodiment, a top-down method of making an artificial liquid-repellent surface includes: depositing and patterning a cap material on a base material; etching away a portion of the base material not covered by the cap material wherein a portion of the base material underlying the patterned cap material is etched away; depositing cap material onto exposed bottom and side of base material created by the prior etching operation; removing the material on the bottom of the base material; and etching away the portion of the base material not covered by the cap material in a manner that forms microstructures having doubly re-entrant topology.

In another embodiment, a bottom-up method of making an artificial liquid-repellent surface includes: forming holes through a sacrificial material; patterning the front surface of the sacrificial material to circumscribe the holes in the sacrificial material; bonding a backside of the sacrificial material to a base material; depositing or growing a base material or a structural material into and above the holes, wherein the base material or structural material extends slightly beyond an outer edge of the circumscription around each hole on the sacrificial material; and removing the sacrificial material.

In another embodiment, a method of making a liquid-repellant artificial surface includes: forming microstructures with re-entrant cap; and creating an internal stress in the re-entrant cap so that the stress makes the periphery of the cap bend to form a downwardly extended lip having a doubly re-entrant topology.

BRIEF DESCRIPTION OF THE DRAWINGS

In FIG. 6, $\gamma$ refers to surface tension of the liquid.

FIG. 7 illustrates a droplet being suspended and repelled by the microstructured surface. A liquid is deemed being repelled on a surface if the liquid forms apparent contact angle ($\theta$) larger than 90° and rolls (i.e., does not stick) on the surface. A magnified view of a single microstructure having the doubly re-entrant topology is also illustrated. The surface may be formed from any material and will repel any liquid by beading it up into a droplet with a large apparent contact angle ($\theta$).

DETAILED DESCRIPTION OF THE ILLUSTRATED EMBODIMENTS

Figure 2A:
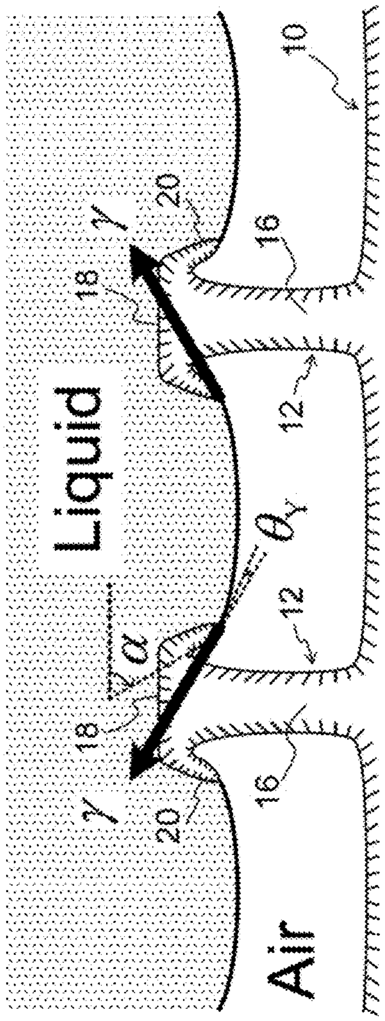
FIG. 2A illustrates an example of a surface with liquid-repulsion and anti-fouling properties that has microstructures having a doubly re-entrant topology. A liquid is illustrated being suspended by the surface.
Figure 2B:
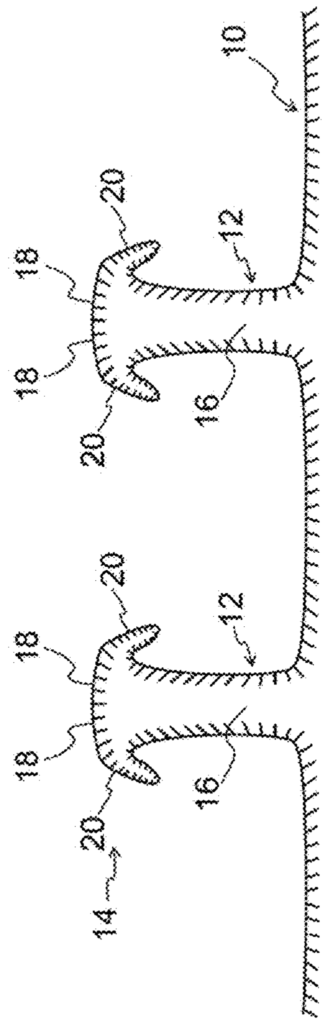
FIG. 2B illustrates the surface of FIG. 2A without a liquid being disposed thereon.

FIGS. 2A and 2B illustrates an embodiment of a surface 10 that contains thereon a plurality of microstructures 12 that have a doubly re-entrant topology. The surfaces 10 described herein are all artificial surfaces meaning that they are not naturally occurring but are instead, man-made structures. As seen in FIGS. 2A and 2B, the surface 10 includes microstructures 12 that extend away from the surface 10 and terminate in a terminal structure 14 (FIG. 2B) having doubly re-entrant topology. The term microstructure 12 as used herein includes structures that have small features that are in the micrometer or even nanometer range. In this embodiment, the microstructures 12 include a post or pillar 16 that extends generally perpendicularly away from the surface 10 and is capped or topped with the terminal structure 14 having the doubly re-entrant topology. In this embodiment, the terminal structure 14 includes cap portion 18 and a downwardly extending lip 20 that extends downward from the entire periphery of the cap portion 18. The cap portion 18 extends or projects laterally beyond the diameter of the underlying post or pillar 16. The cap portion 18 has a width that spans the distance between the opposing downwardly extending lips 20. For post-like microstructures 12 where the cap portion 18 is circular, the width is equal to the diameter.

Referring back to FIG. 2A, it is preferable to have the downwardly extending lip form an angle (α) that is of negative value with respect to a plane of the surface 10 and more preferably within the range of about −30° to about −180°. This angle is measured at the inner surface of the downwardly extending lip 20 as is seen in FIG. 2A. Note the simple structure in FIG. 1A have sidewalls forming angle (α) between 90° and 180° with respect to a plane of the surface 10, and the re-entrant structure in FIG. 1B have sidewalls forming angle (α) between 0° and 90° with respect to a plane of the surface 10. Continuing the consideration from the re-entrant structure with α=0°, note that as the angle (α) becomes below 0°, the sidewall becomes the inner surface, forming a downward lip, as shown in FIG. 2. The thickness of the downwardly extending lip 20 may be uniform or vary. For example, as seen in the embodiment of FIGS. 2A and 2B, the thickness generally decreases in the direction of the downwardly extending lip 20. However, in other embodiments, the downwardly extending lip 20 may have a substantially uniform thickness. Typically, the downwardly extending lip 20 has a maximum thickness of around 5 μm and more preferably below 1 μm. A thinner downwardly extending lip 20, particularly, at the tip of the lip 20 is preferred. The downwardly extending lip 20 generally extends downward in the vertical direction less than about 10 μm. In one preferred embodiment, the downwardly extending lip 20 has a thickness adjacent to a tip of the lip 20 of less than 10% of the width of the cap portion 18 and a length less than 10% of the width of the cap portion 18. Adjacent to the tip of the lip 20 is meant to encompass about 25% terminal length of the downwardly extending lip 20.

As seen in FIGS. 2A and 2B the cap portion 18 has a flat (FIG. 2A) or rounded (somewhat dome-like) cross-sectional shape (FIG. 2B). In the embodiments of FIGS. 2A and 2B, the cap portion 18 of the terminal structure 14 typically has a thickness that is smaller than the diameter of the underlying post 16. For example, the cap portion 18 and the downwardly extending lip 20 may be nanostructures while the post 16 may be a larger microstructure. In the embodiment of FIGS. 2A and 2B, the thickness of the cap portion 18 is on the same order as or substantially equal to the thickness of the downwardly extending lip 20. Of course, when the cap portion 18 has a rounded or domed appearance; the thickness will vary over the domed structure.

The surface 10 that contains thereon the plurality of microstructures 12 as described above includes microstructures 12 separated from one another by pitch distance. In one aspect of the invention, the pitch of the microstructures 12 on the surface 10 should be less than about 500 μm. Microstructures with a pitch larger than 500 μm do not provide enough Laplace pressure to counterbalance the liquid pressure present in most practical situations. The smaller the pitch is the more reliable the structures are in repelling liquids but become more difficult to fabricate. This invention teaches the shapes and dimensions of the doubly re-entrant topology one needs to satisfy to maintain the high repellency, as fabrication becomes more difficult to achieve smaller pitches.

Figure 3:
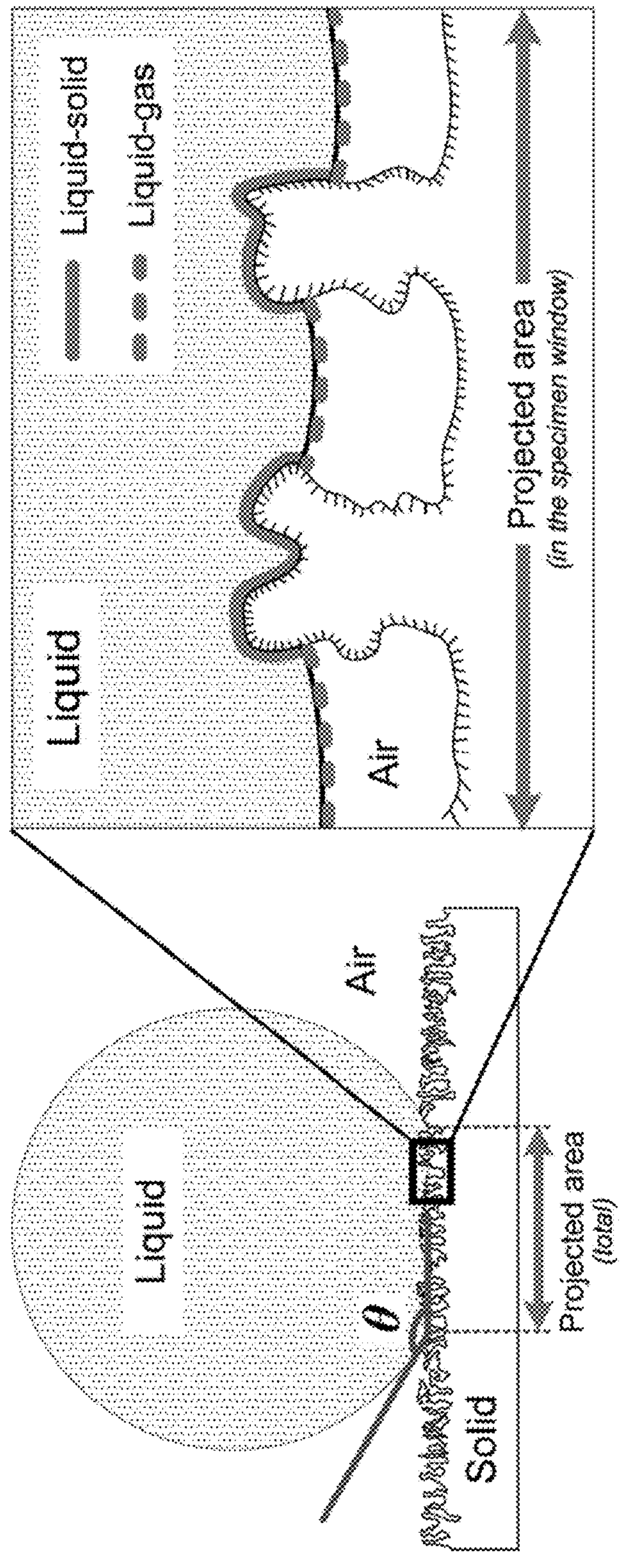
FIG. 3 illustrates a liquid being suspended on a surface containing random surface structures. A magnified view of the surface is provided (inset) along with a projected area (solid straight gray line with arrows). A parameter called the liquid-solid contact fraction or solid fraction ($f_s$) is defined as the ratio between the liquid-solid contact area (solid gray lines) and the projected area. Another parameter, called the liquid-gas contact fraction or gas fraction ($f_g$) is defined as the ratio between the liquid-gas contact area (dashed gray lines) and the projected area. Note that the liquid-solid contact fraction ($f_s$) can, in some instances, be above unity.

To render any solid surface 10 repellant to all liquids, a doubly re-entrant topology is necessary but not sufficient. It has been discovered that to render any solid surface including, for example, wetting solids such as clean glass repellent to all liquids, the solid surface 10 should be properly structured to have a roughness with both: (1) a doubly re-entrant topology; and (2) a reduced liquid-solid contact fraction ($f_s$). For example, the doubly re-entrant topology of FIG. 2A can suspend almost all liquids on top of microstructures 12 (structures that have features measured in nanometers or micrometers), yet to achieve the repellency contemplated by this invention an additional criteria needs to be satisfied. In order to understand this additional requirement, the parameter denoted the liquid-solid contact fraction $f_s$ introduced. With reference to FIG. 3, $f_s$ is defined as the ratio of liquid-solid contact area (solid gray lines in FIG. 3) to the total projected area (solid straight gray line with arrows in FIG. 3). Correspondingly, a liquid-gas contact fraction $f_g$ is similarly defined as the ratio of liquid-gas contact area (i.e., suspended meniscus shown as dashed gray lines in FIG. 3) to the total projected area (solid straight gray line with arrows in FIG. 3).

If made of a hydrophilic material with intrinsic contact angle over 70° (i.e., $\theta_Y$>) 70°), a doubly re-entrant structured surface 10 with a $f_s$ below 75% (i.e., $f_s$<75%) will repel (i.e., θ>90°) most liquids including many solvents. This is the degree of repellency the re-entrant microstructures made of a hydrophobic material could accomplish. For most inherently wetting condition ($\theta_Y$~0°), which spans from water on clean glass to fluorinated solvents on polytetrafluoroethylene (PTFE), a $f_s$ below 50% (i.e., $f_s$<50%) will repel any liquid (i.e., θ>90°) and a $f_s$ below 6% (i.e., $f_s$<6%) will super-repel any liquid (θ>150°). If the $f_s$ is not lower than 50% (i.e., $f_s$>50%), some liquids, such as 3M™ Fluorinert™ FC-72, may not be repelled on the surface (i.e., θ<90°). However, they may still be suspended on the surface, i.e., not penetrating the voids of the surface structures 12; it is just that they may not bead as droplets or bead as droplets but stick to the surface. As the solid fraction $f_s$ increases, the types of liquids that bead on the surface decreases. The inventors have found that the use of a doubly re-entrant structured surface 10 in combination with $f_s$ lower than 50% will provide the high repellency that cannot be obtained on other existing structured surfaces especially for highly wetting liquids.

Figure 1A:
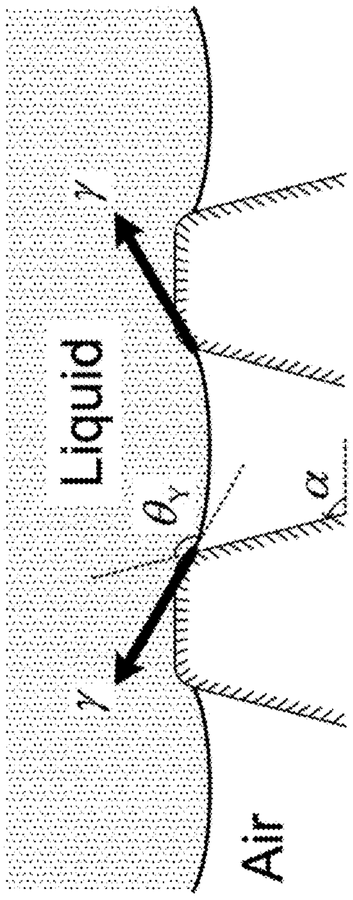
FIG. 1A (prior art)
FIG. 1A illustrates a prior art superhydrophobic surface that can be represented by a simple surface topology. The topology of the FIG. 1A surface is not re-entrant. The arrows labeled γ refers to surface tension force. $\theta_Y$ refers to the Young's angle and α represents the angle of structure's sidewall with respect to the horizontal surface.

It is widely accepted that roughness has great influence on a surface's wetting behavior; the roughness would make a hydrophobic surface more hydrophobic and a hydrophilic surface even more hydrophilic. The determining factor accounting for this amplifying effect of roughness lies in whether the liquid has been suspended on the microstructures of the roughened surface to form a composite interface of liquid-solid and liquid-air or the liquid has penetrated the microstructures of the roughness to form a single interface of liquid-solid. As shown in FIG. 1A, a liquid would wet a surface roughened with simple structures once the Young's angle $\theta_Y$ becomes smaller than the angle of structure's sidewall (with respect to the horizontal surface) α.

Figure 1B:
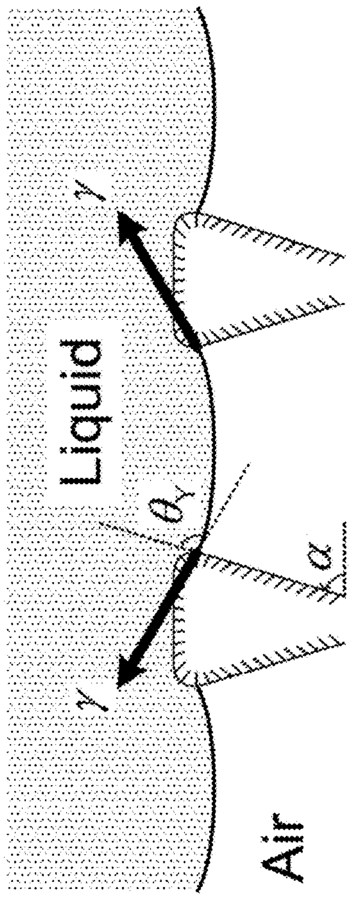
FIG. 1B (prior art)
FIG. 1B illustrates an example of a prior art superhydrophobic surface that has re-entrant topology.

To suspend more liquids, more geometric detail on the roughness is needed so that a hydrophilic material makes the structured surface hydrophobic or even superhydrophobic. The key is to let surface tension of the liquid point upward to provide suspension force even for a wetting liquid (i.e., $\theta_Y$<90°). This is realized by reducing the sidewall angle α to form a roughness with re-entrant structures, as shown in FIG. 1B, which provide suspension force to a wetting liquid with surface tension pulling upward. With only the vertical component of surface tension utilized for suspension, more strongly wetting liquids require more significantly re-entrant sidewall (i.e., $\theta_Y$→0°). Ideally, an optimum re-entrant structure with horizontal overhang (i.e., α=0°) can suspend any liquid with $\theta_Y$>0° in absence of any liquid pressure. However, for perfectly wetting liquids with $\theta_Y$=0°, e.g., fluorinated solvents, an ideal re-entrant structure with α=0° would still become wetted. Moreover, liquid pressure (e.g., hydrostatic pressure because of gravity, Laplace pressure in a droplet) and environmental disturbances always exist in reality, making the suspension too weak to be practically reliable. Thus, re-entrant structures, while capable of suspending some liquids, do not offer the ability to suspend a larger universe of liquids.

Figure 4A:
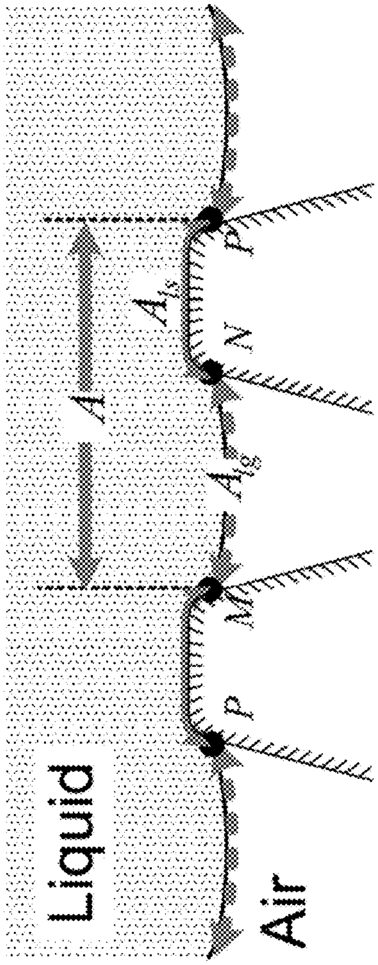
FIG. 4A (prior art)
FIG. 4A illustrates the structure of FIG. 1A with the liquid-solid contact area ($A_{ls}$) and the liquid-gas contact area ($A_{lg}$) illustrated. Also illustrated is the projected area (A). Note that the microstructures in FIG. 4A are periodically disposed on the surface so that one unit (i.e., pitch) represents the entire surface for a given liquid-solid contact area ($A_{ls}$) or liquid-gas contact area ($A_{lg}$).
Figure 4B:
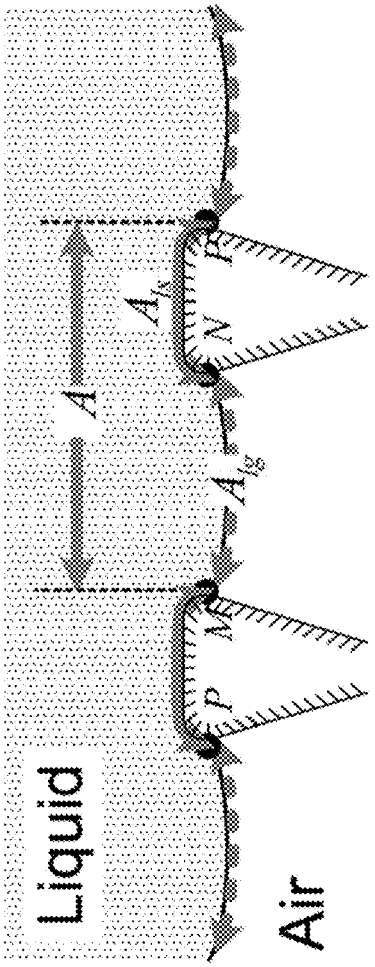
FIG. 4B (prior art)
FIG. 4B illustrates the structure of FIG. 1B with the liquid-solid contact area ($A_{ls}$) and the liquid-gas contact area ($A_{lg}$) illustrated. Also illustrated is the projected area (A). Note that the microstructures in FIG. 4B are periodically disposed on the surface so that one unit (i.e., pitch) represents the entire surface for a given liquid-solid contact area ($A_{ls}$) or liquid-gas contact area ($A_{lg}$).
Figure 5:
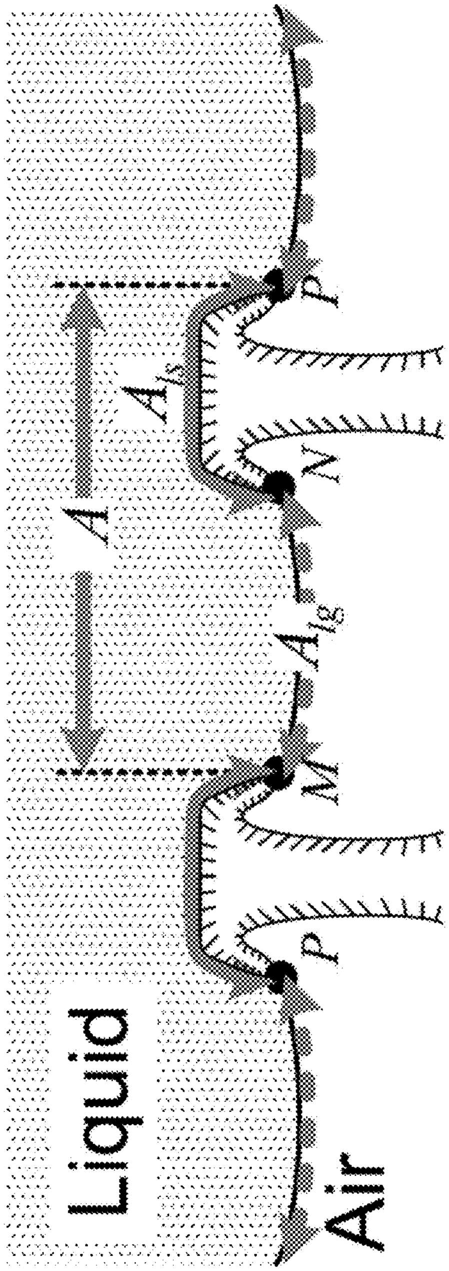
FIG. 5 illustrates the structure of FIG. 2 with the liquid-solid contact area ($A_{ls}$) and the liquid-gas contact area ($A_{lg}$) illustrated. Also illustrated is the projected area (A). Note that the microstructures in FIG. 5 are periodically disposed on the surface so that one unit (i.e., pitch) represents the entire surface for a given liquid-solid contact area ($A_{ls}$) or liquid-gas contact area ($A_{lg}$).

It has been discovered that by pushing the re-entering degree from a re-entrant topology to a doubly re-entrant topology, the suspension is no longer limited by the intrinsic contact angle $\theta_Y$ so that, theoretically, any liquid can be suspended. With reference to the embodiment of FIG. 2A, surface tension will always pull upward making the liquid suspension more robust than the one from a re-entrant topology. Moreover, even for perfectly wetting liquids with $\theta_Y$=0°, the condition for liquid suspension (i.e., $\theta_Y$>α) is unconditionally satisfied because sidewall angle α is negative (i.e., α<0°) for a doubly re-entrant structure. A doubly re-entrant topology is a necessity to suspend most liquids regardless of the solid material, i.e., regardless of the intrinsic contact angle $\theta_Y$. For comparison purposes, FIGS. 4A, 4B, and 5 show the liquid-solid contact area and liquid-gas contact area for simple (FIG. 4A), re-entrant (FIG. 4B), and doubly re-entrant (FIG. 5) structures, respectively. Considering the periodic nature of the structures, only one period is used to calculate the solid fraction $f_s$=(the solid curved line between N and P)/(the imaginary straight line A between M-P). Similarly, the gas fraction $f_g$=(the dashed curved line between M and N)/(the imaginary straight A line between M-P).

Although rough surfaces with re-entrant or doubly re-entrant topology can suspend wetting liquids, they can repel the wetting liquids only if the solid fraction $f_s$ is sufficiently small as well. A problem is that the reduction of solid fraction $f_s$ also reduces the suspension force, making it difficult to suspend the wetting liquid. The overhang or microhoodoo structure, which is an extreme case (α=0°) of the re-entrant structures, was successful in repelling liquids including many organic solvents. See Tuteja et al., Robust omniphobic surfaces, PNAS, Vol. 105, No. 47, pp. 18200-18205 (2008). However, such surfaces could not suspend or repel fluorinated solvents, which are more wetting than the organic solvents. Only doubly re-entrant structures are able to repel all liquids, because by fully utilizing the liquid surface tension for suspension, doubly re-entrant structures provide more room to accommodate the reducing suspension force despite the decreasing liquid-solid contact. This invention addresses why such doubly re-entrant structured surfaces, which may repel all liquids, could not be created before even though the overhang (i.e., α=0°) structured surfaces repellent to most liquids have already been developed.

First, one recognizes that doubly re-entrant structures (e.g., FIGS. 2A and 5) have a solid fraction $f_s$ considerably larger than simple structures (FIG. 4A) and re-entrant structures (FIG. 4B). Given a main column or ridge (of a certain width or diameter) on the substrate, the solid fraction $f_s$ of a doubly re-entrant structure should be larger than that of a re-entrant structure because (1) the top surface of the doubly re-entrant structure should be larger than the top surface of the re-entrant structure to accommodate the re-entering nature of the structure below the surface and (2) the downward surface of the doubly re-entrant structure adds to the solid fraction $f_s$ as an extra solid-liquid contact area. As the solid fraction $f_s$ decreases in general (i.e., as the post 16 of the microstructures 12 becomes narrower), the disparity in the solid fraction $f_s$ between the doubly re-entrant structure and the re-entrant structure would grow more because the contribution of the post width to the solid fraction $f_s$ decreases.

The recognition of the difficulty against making doubly re-entrant structures of a small solid fraction $f_s$ led to this invention, which teaches only certain type of doubly re-entrant topology provides the previously unattainable degree of repellency. Analyzing the geometry of FIG. 2A and FIG. 5, one notes three design rules used to minimize the solid fraction $f_s$ for a given post 16 on the surface 10: (1) make the downwardly extending lip as steep or vertical as possible, (2) make the downwardly extending lip as short as possible, and (3) make the downwardly extending lip as thin as possible. Considering the availabilities and limitations of current fabrication methods, the angle α of the downwardly extending lip (inner surface) in some embodiments described herein is limited to be steeper than 30° (i.e., α<−30°; FIG. 2A). In addition, the thickness of the downwardly extending lip 20 preferably should be smaller than 5 μm and the length of the downwardly extending lip to be shorter than 10 μm.

Figure 6:
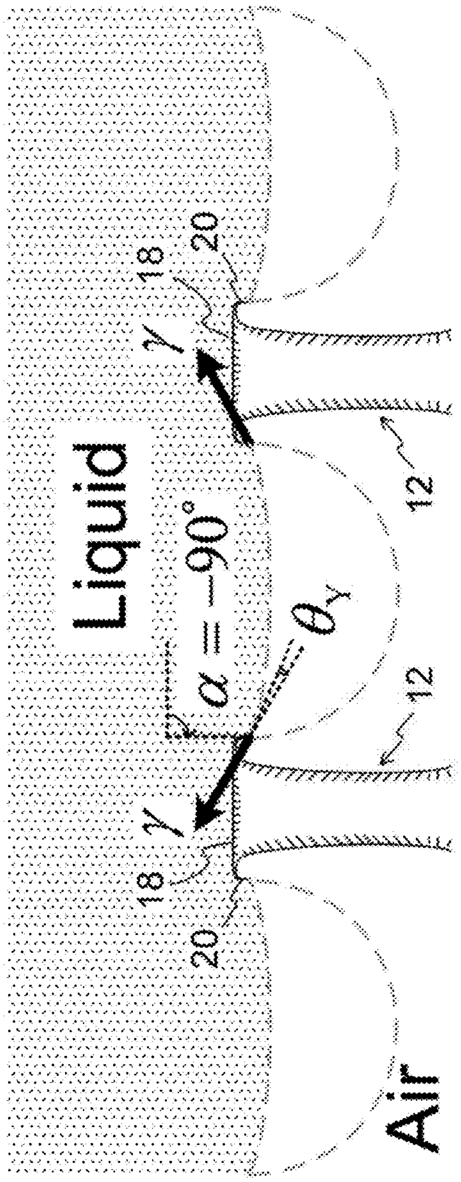
FIG. 6 illustrates an embodiment of an ideal doubly re-entrant structure with perfectly vertical overhangs or lips ($\alpha=-90°$) that are both thin and short. The liquid meniscus pins at the tip of the vertical lips but curve to build up Laplace pressure to resist liquid wetting in response to external pressure (e.g., hydrostatic pressure). Both an ordinary meniscus and the maximum curved meniscus are depicted in gray dash line.

FIG. 6 illustrates an ideal microstructure 12 construction having doubly re-entrant topology. In the embodiment of FIG. 6, with minimum top area (i.e., flat top), the downwardly extending lip 20 of the doubly re-entrant microstructures 12 are made as vertical (i.e., close to $\alpha=-90°$), thin, and short as possible. The more vertical the downwardly extending lip 20 is, the more room it provides to accommodate liquid pressure. If the angle of downwardly extending lip 20 becomes even smaller (i.e., $\alpha<-90°$), the resistance against the liquid pressure deteriorates compared with the vertical (i.e., $\alpha=-90°$) case. By making the downwardly extending lip 20 thinner, the break-in force by the liquid pressure to wet the cavity is minimized and the suspension force from surface tension is maximized. A short and thin downwardly extending lip 20 will minimize its addition to the solid fraction $f_s$, yielding more repellency.

Figure 7:
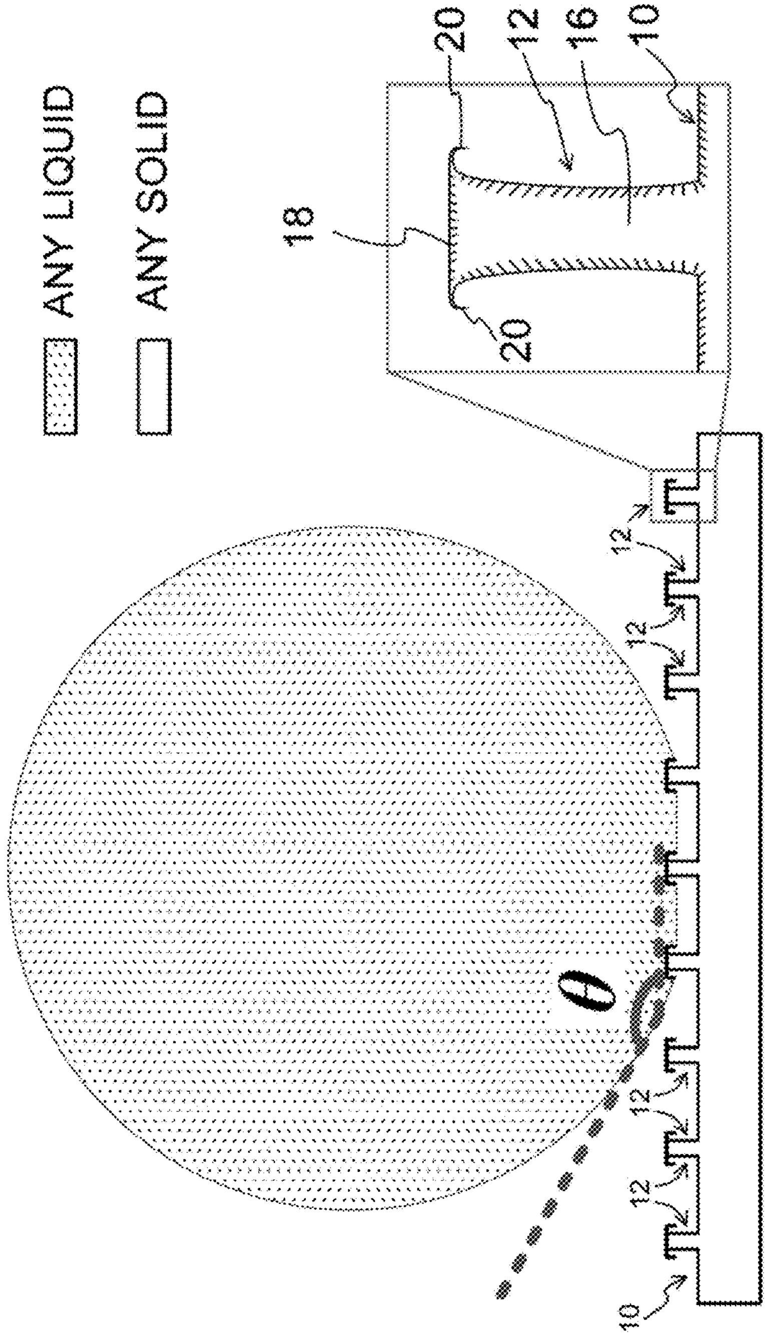
FIG. 7 illustrates another view of a surface with liquid-repulsion and anti-fouling properties that has microstructures having a doubly re-entrant topology and a low liquid-solid contact fraction ($f_s$).
Figure 8:
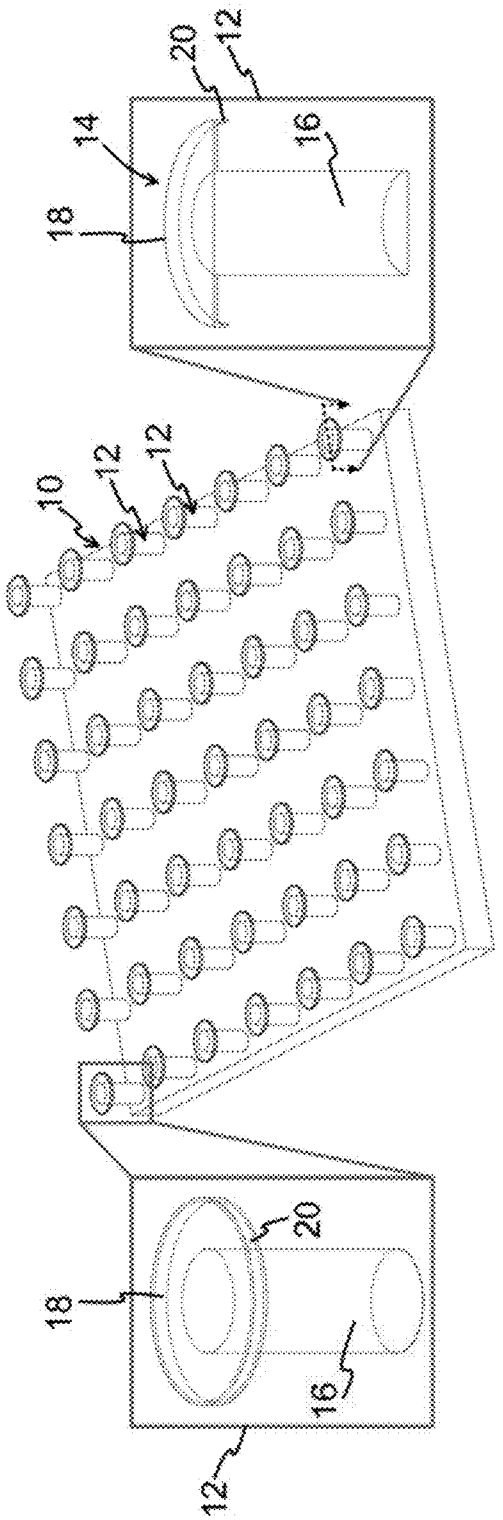
FIG. 8 illustrates a perspective view of a surface made of another ideal doubly re-entrant structured microstructures. A magnified and cross-sectional view of one of the microstructures is also illustrated in FIG. 8.

FIG. 7 illustrates a surface 10 containing microstructures 12 of the ideal type illustrated in FIG. 6 and with low liquid-sold contact fraction (i.e., low $f_s$). Such a surface will repel any liquid by beading it up into a droplet with large apparent contact angle θ. FIG. 8 illustrates a perspective view of a surface 10 made of the ideal doubly re-entrant structured microstructures 12. A magnified and cross-sectional view of one of the microstructures is also illustrated in FIG. 8. The ideal terminal structure 14 is situated atop a post 16 and includes the cap portion 18 along with the downwardly extending lip 20. When the solid fraction is below 50% (i.e., $f_s<50\%$) the surface is repellent to any liquid (i.e., $\theta>90°$). When the solid fraction $f_s$ is below 6% (i.e., $f_s<6\%$), the surface is super-repellent to any liquid (i.e., $\theta>150°$ and a small roll-off angle).

Figure 9A:
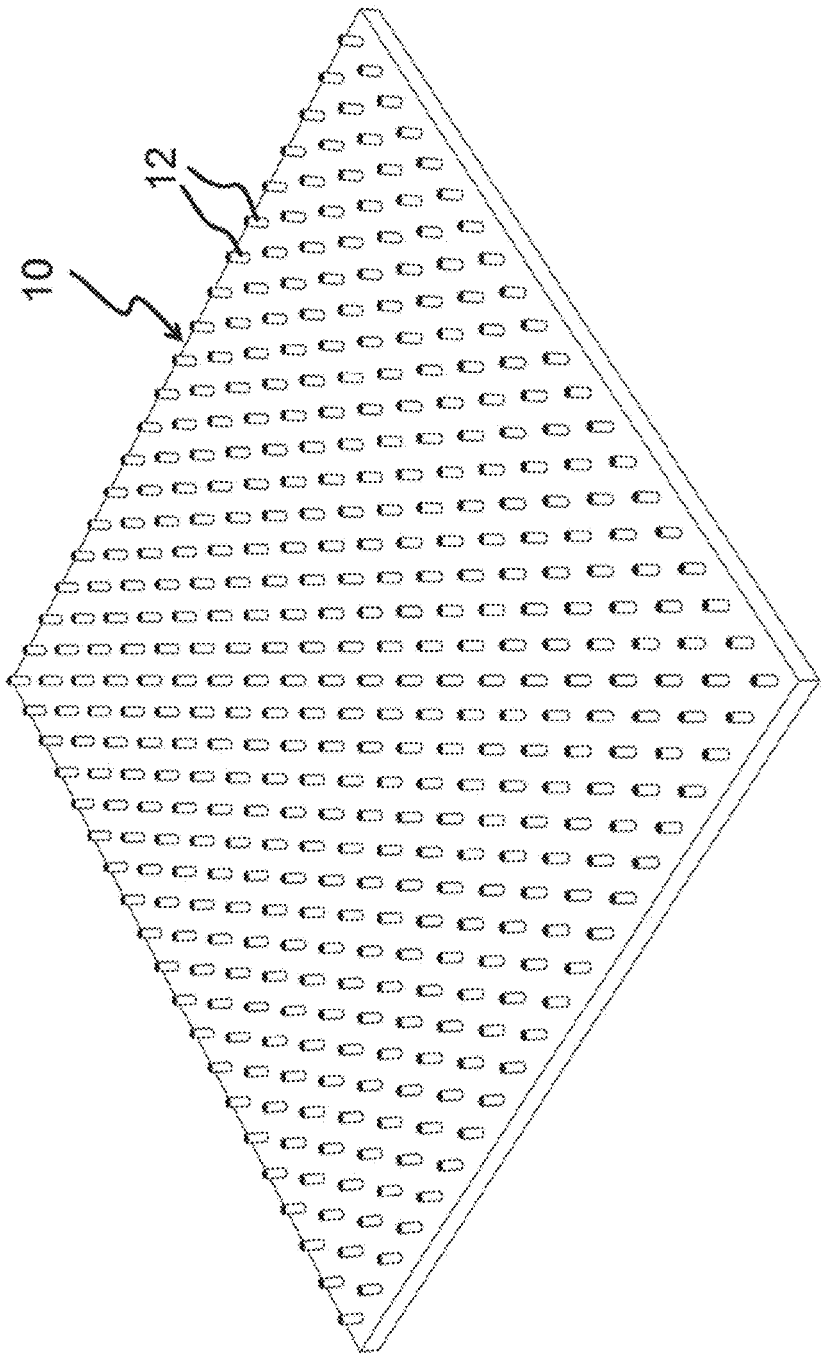
FIG. 9A illustrates one illustrative pattern of microstructures where post or pillar like structures are formed on a surface. Note that the terminal structures containing the doubly re-entrant topology cannot be seen in FIG. 9A although they are present.
Figure 9B:
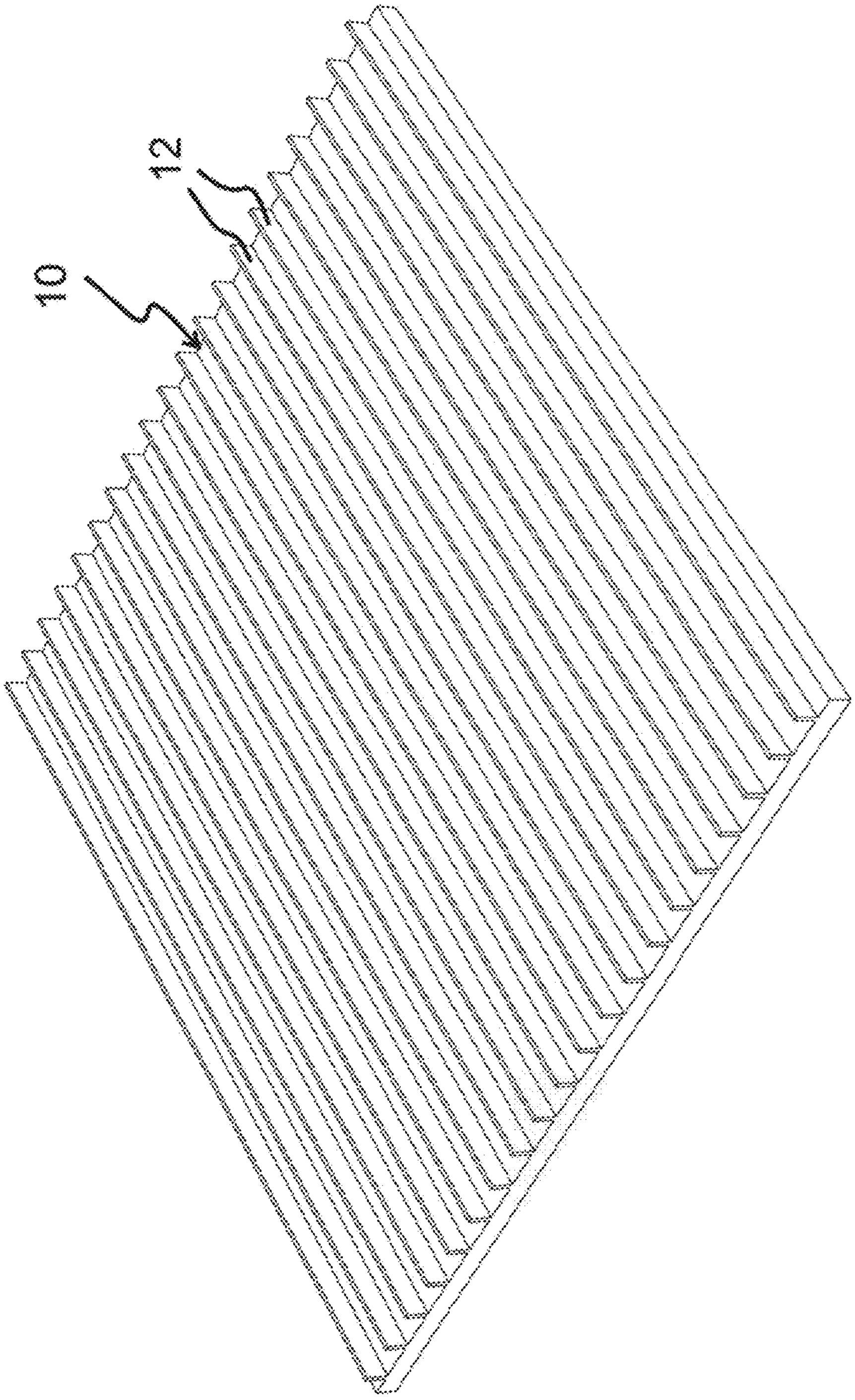
FIG. 9B illustrates one illustrative pattern of microstructures where stripes or grating structures are formed on a surface. Note that the terminal structures containing the doubly re-entrant topology cannot be seen in FIG. 9B although they are present.
Figure 9C:
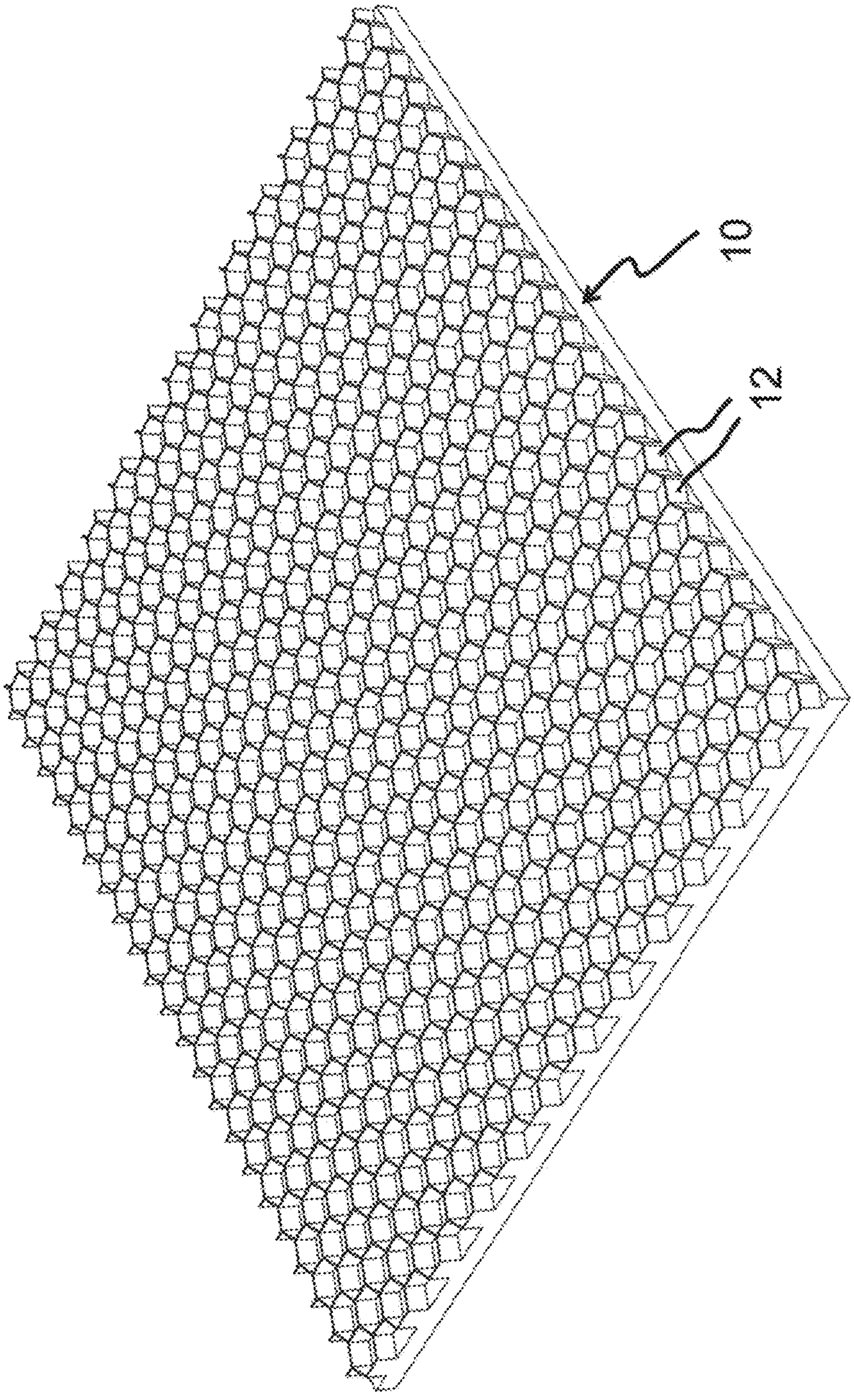
FIG. 9C illustrates one illustrative pattern of microstructures that form closed cells on a surface. Note that the terminal structures containing the doubly re-entrant topology cannot be seen in FIG. 9C although they are present.

It should be understood that liquid repellent surfaces with doubly re-entrant microstructures 12 can be realized in many different patterns. For example, the surface 10 can be formed as an array of posts (circular as shown in FIG. 9A), stripes, ridges, or gratings (e.g., periodic gratings as shown in FIG. 9B), a closed cell structure forming holes therein (e.g., a hexagonal comb as shown in FIG. 9C), arbitrary shapes, or variations of the above.

Figure 10:
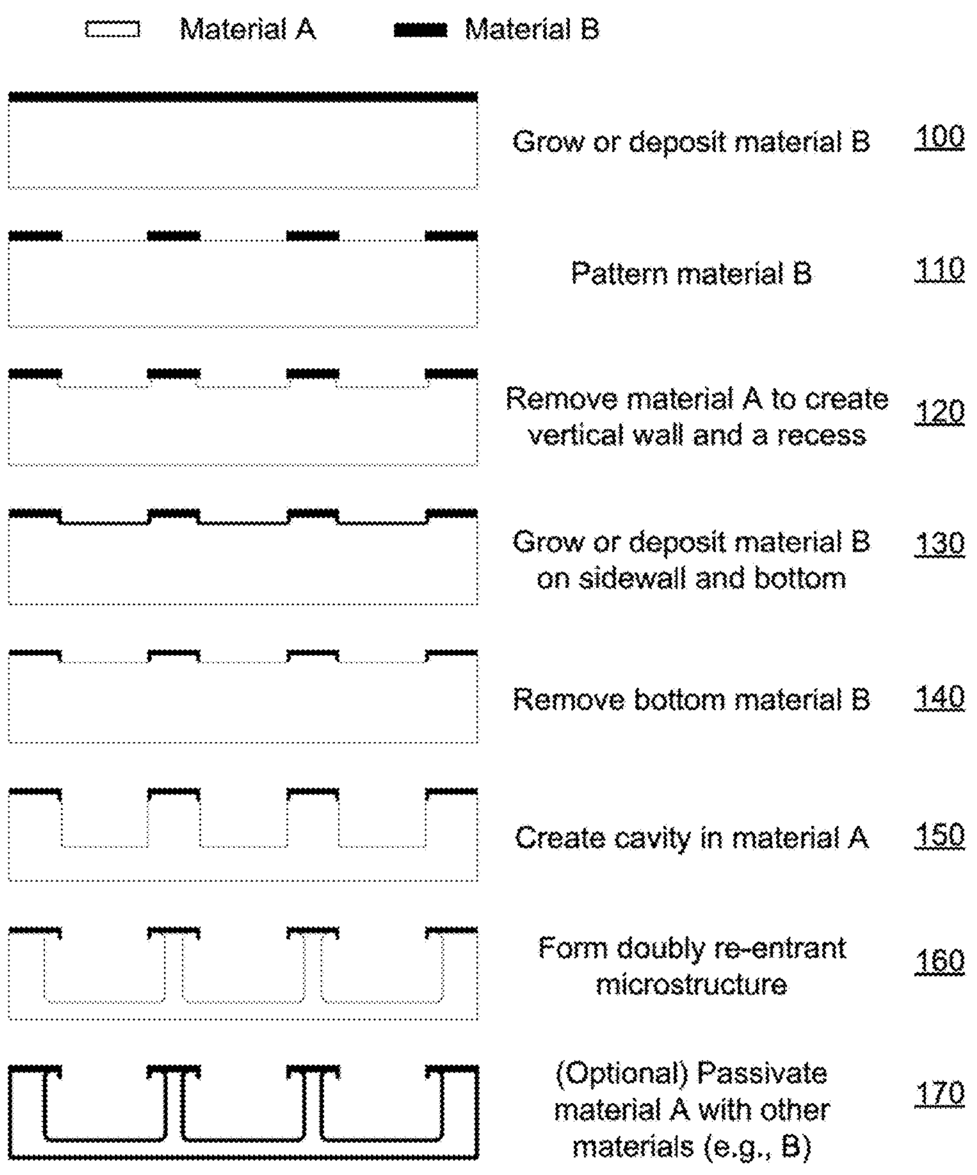
FIG. 10 illustrates an illustrative top-down process used to manufacture a material substrate into a surface with microstructures having doubly re-entrant topology. A ceramic material is specifically illustrated although other materials are contemplated.

FIG. 10 illustrates a top-down process used to create a surface 10 containing microstructures 12 according to one embodiment of the invention. In this embodiment, as seen in operation 100, a cap material (denoted material B in FIG. 10) is grown or otherwise deposited onto a base material (denoted material A in FIG. 10). As seen in operation 110, a layer of cap material B on the upper surface of the base material A is patterned anisotropically, e.g., by chemical etching. This patterning will define the spacing or pitch of the microstructures 12 on the surface 10 and thus primarily define the liquid-solid contact fraction. Next, in operation 120, the base material A that is not covered by the material B mask is removed including a portion of the base material A underlying or undercutting the cap material B. An etching process may be used for purpose. Next, as seen in operation 130, a relatively thin layer of the cap material B is deposited or otherwise grown onto the exposed bottom and sidewalls of the base material A (created by prior removal process). The cap material B on the bottom is then removed in operation 140 using, for instance time-controlled anisotropic etching, leaving the cap material B on the sidewalls as well as the majority of the cap material B on the top intact. In operation 150, base material A is again removed using, for example, an anisotropic etching process to create depth within the base material A. Next, in operation 160, additional removal of the base material A in the vertical and horizontal directions is undertaken to expose the doubly re-entrant microstructures 12. This may be accomplished through another isotropic etching process. As an optional operation 170, a passivation layer (e.g., material B) is applied to coat the exposed surfaces of the base material A.

Figure 11:
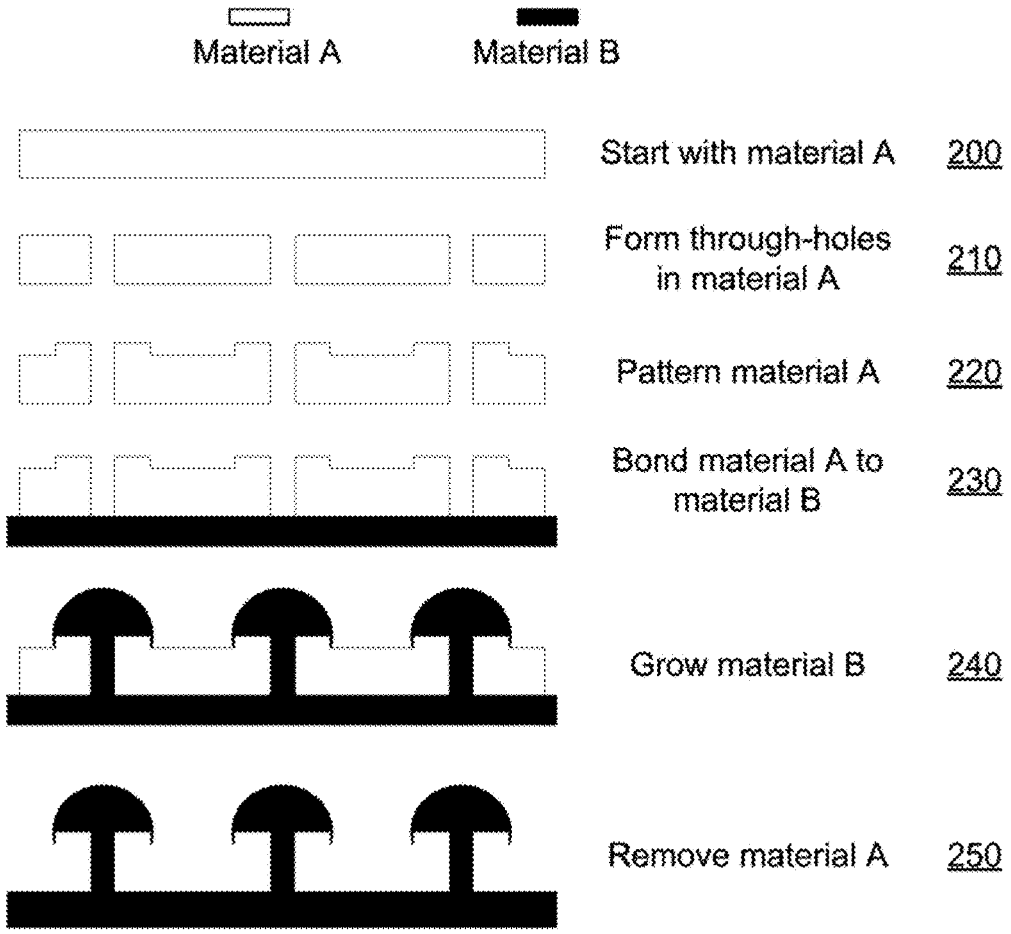
FIG. 11 illustrates an illustrative bottom-up process used to manufacture a material substrate into a surface with microstructures having a doubly re-entrant topology. A metallic material is specifically illustrated although other materials are contemplated.

FIG. 11 illustrates a bottom-up process used to create a surface 10 containing microstructures 12 according to one embodiment of the invention. This embodiment illustrates a process that can fabricate liquid-repellent surfaces in material B (e.g., a metal) using a sacrificial material A. Sacrificial material A and material B are chosen to have distinctively different properties, e.g., chemical or electrical. As seen in operation 200 the process starts with a sacrificial material (denoted material A in FIG. 11). This sacrificial material A is then patterned and etched through to create holes with desired pitch of structures as seen in operation 210. Next, in operation 220, the sacrificial material A is patterned again to form boundaries determining where the doubly re-entrant structures will be formed using chemical etching or thermal molding, etc. The other side of material A is then bonded to a base material B (denoted as material B in FIG. 11) as seen in operation 230. A controlled deposition or growth of material B (or another structural material) is then performed in operation 240 up to the point that material B (or the structural material) deposits or grows enough to slightly cover the sidewall of the boundaries defined on the sacrificial material A. In the final operation 250, the sacrificial material A is removed (e.g., chemical etching), leaving microstructures 12 of material B (or a third material) on the base part of material B.

Figure 12:
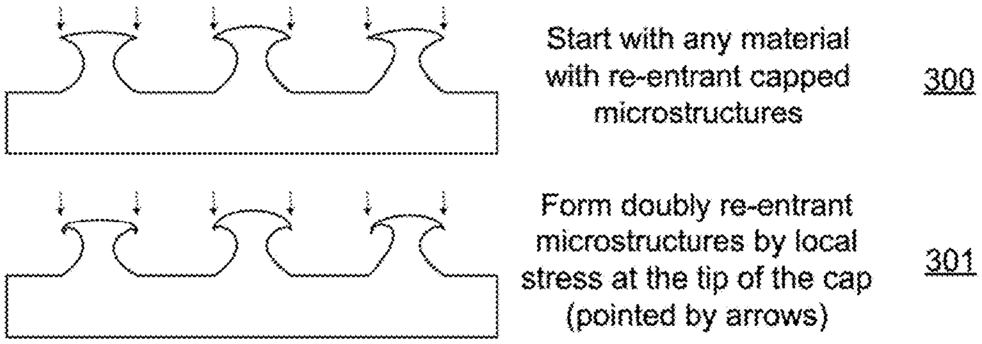
FIG. 12 illustrates an illustrative process used to manufacture a surface with microstructures having a re-entrant topology into a surface with microstructures having a doubly re-entrant topology. A metallic material is specifically illustrated although other materials are contemplated.

FIG. 12 illustrates another process used to create a surface 10 containing microstructures 12 according to one embodiment of the invention. It starts from a surface with re-entrant microstructures, i.e., a cap with laterally extending lip, as seen in operation 300. In operation 301 a mechanical stress is built in the re-entrant portion of the cap, i.e., the laterally extending lip. The mechanical stress causes the lip to bend downward, rendering the initially re-entrant microstructure doubly re-entrant. Ways of creating the local stress includes heating and cooling (e.g., by infrared radiation or microwave heating), particle bombardment with or without additional guiding force (e.g. electromagnetic force), chemical stress by immersing in corrosive liquid or vapor.

EXPERIMENTAL

A liquid-repellent surface having a surface containing thereon a plurality of microstructures having a doubly re-entrant topology and a low liquid-solid contact fraction ($f_s$) was constructed. In this embodiment, microstructures 12 were formed from silicon dioxide ($SiO_2$) for several reasons. First, clean $SiO_2$ is highly wetted (i.e., $\theta_Y<1°$) by most liquids (except liquid metals like mercury) including water. Since roughening of a $SiO_2$ surface is supposed to amplify the liquid affinity to complete wetting, structuring a $SiO_2$ surface to repel liquids should provide a stark contrast to existing approaches. Second, silicon (Si) micromachining provides sophisticated equipment and techniques to process $SiO_2$. With precisely controlled thermal oxidation of a shallow-etched silicon surface followed by three sequential etching steps on $SiO_2$ and Si, a $SiO_2$ surface (1.7 cm×1.7 cm) with close-to-ideal doubly re-entrant structures was successfully fabricated.

Figure 13A:
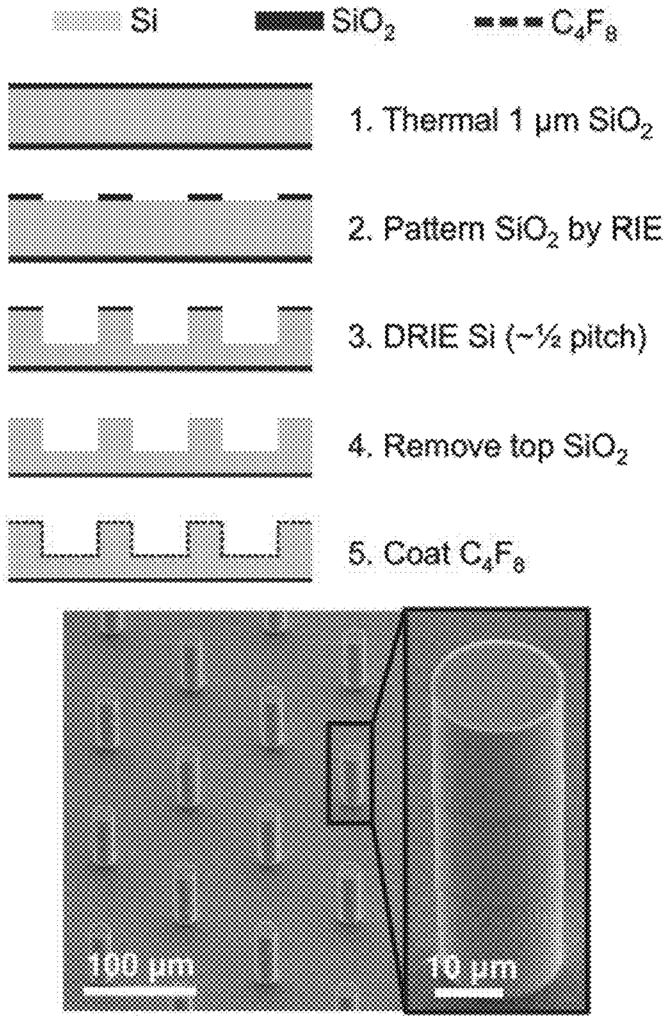
FIG. 13A illustrates a process used to create a simple vertical post structure which was used as a comparison in the experimental results. This is an extreme or ideal case (i.e., sidewall angle=90°) of FIG. 1A. A SEM micrograph image of the posts including one magnified post is also illustrated.
Figure 13B:
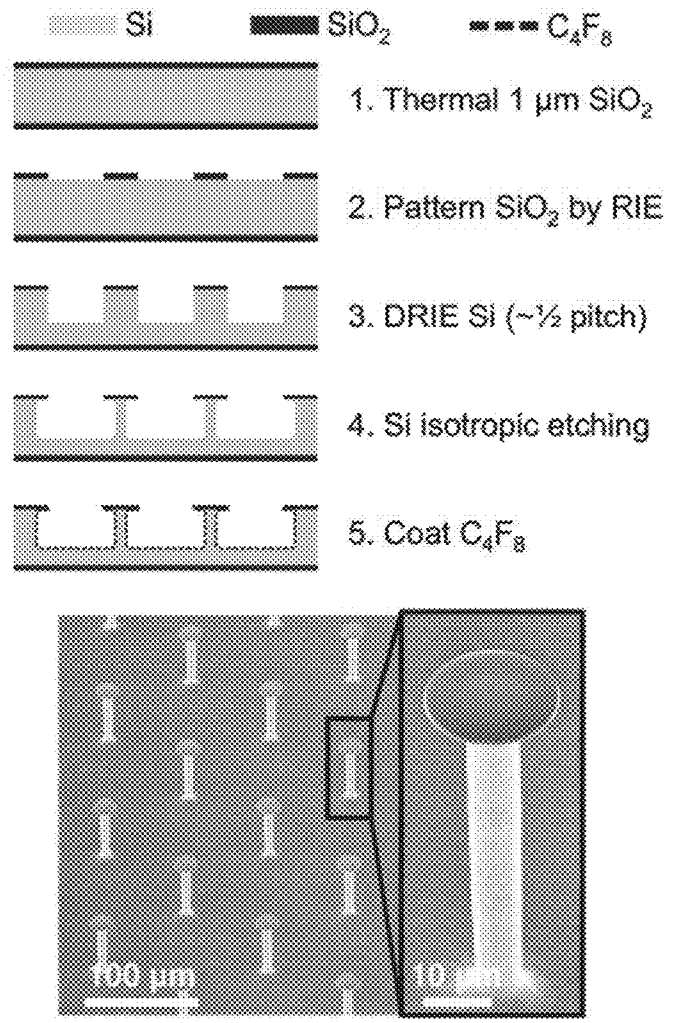
FIG. 13B illustrates a process used to create a re-entrant post structure which was used as a comparison in the experimental results. This is an extreme or ideal case (i.e., sidewall angle=0°) of FIG. 1B. A SEM micrograph image of the posts including one magnified post is also illustrated.
Figure 13C:
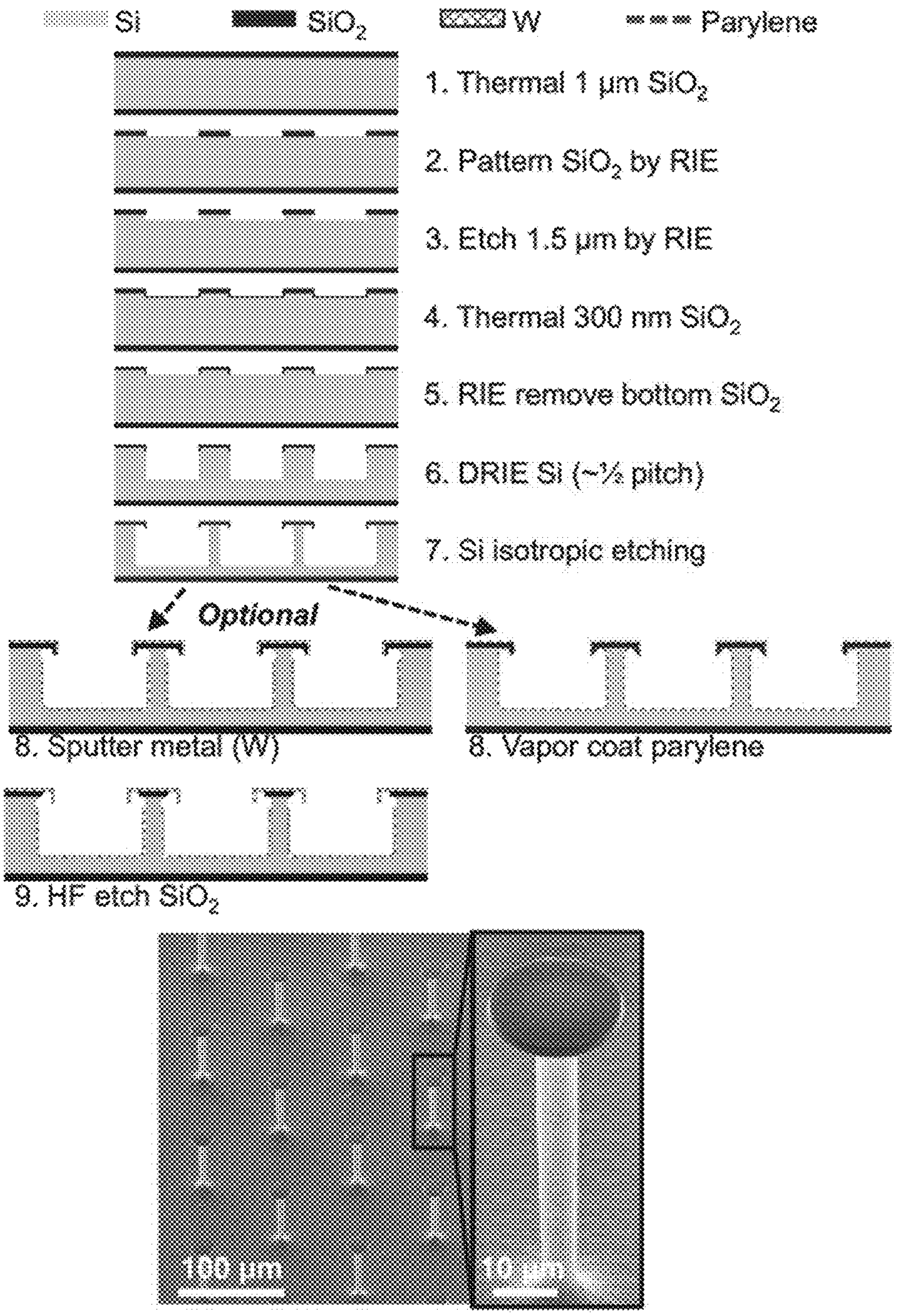
FIG. 13C illustrates the process used to create a doubly re-entrant structure. This is an extreme or ideal case (i.e., sidewall angle=−90°) of FIG. 2. Note that FIG. 13C includes operations used to create the ceramic ($SiO_2$) doubly re-entrant structures which ends in step 7 in addition to the optional additional processes (steps 8 and 9; step 8) to create metal-coated and polymer-coated doubly re-entrant structures, respectively. An SEM micrograph image of the $SiO_2$ posts including one magnified post is also illustrated.

FIG. 13C illustrates the process used to create the doubly re-entrant structures. FIG. 13A illustrates a process used to create a simple vertical post structure which was used as a comparison in the experimental results. Likewise, FIG. 13B illustrates a process used to create a re-entrant post structure which was used as a comparison in the experimental results. Referring to FIG. 13C, a relatively thick 1 μm thick layer of $SiO_2$ is thermally grown atop silicon wafers (prime grade, (100) type, 400-500 μm thick). The $SiO_2$ is then patterned by photolithography and reactive ion etching (RIE). Etching is then performed up to 1.5 μm using RIE to undercut portions of silicon underlying the patterned $SiO_2$. Using $SiO_2$ as hard mask, a shallow silicon anisotropic etching (~1.3 μm) and another shallow silicon isotropic etching (~200 nm) were both performed by RIE. A thin layer (300 nm) of $SiO_2$ was then grown to cover the exposed bottom and sidewall silicon surfaces (which later form the downwardly extending lip). Next, RIE was used to etch the bottom layer of $SiO_2$. This was followed by DRIE silicon etch (~½ pitch) to further etch away vertically within the silicon. Next, silicon isotropic etching (RIE or $XeF_2$) was used to etch away silicon and expose the doubly re-entrant structures. The surface was ready for testing after a final cleaning with $O_2$ plasma, ALEG™ 380 bath (85° C. for 20 minutes), hot Piranha bath ($H_2SO_4$:$H_2O_2$=3:1, 95° C. for 5 minutes) and deionized water rinse to ensure a clean $SiO_2$ surface without any post-etch polymers and organics remained.

Still referring to FIG. 13C, for some experiments, the silicon dioxide doubly re-entrant microstructures underwent additional processing steps to create doubly re-entrant tungsten posts and doubly re-entrant parylene posts. For tungsten posts, starting with the fabricated doubly re-entrant $SiO_2$ posts (step 7 of FIG. 13C), a thin layer of tungsten (~281 nm thick) was sputter-coated on both the top and outer sidewall of the vertical overhang. The original $SiO_2$ vertical overhang was then selected removed by etching in ~25% HF (49% HF:$H_2O$=1:1) for 5-7 minutes with stirring and rinsing in deionized water. For parylene posts, starting with the fabricated doubly re-entrant $SiO_2$ posts (step 7 of FIG. 13C), a thin layer of parylene (~139 nm) was vapor-deposited. Because of the excellent conformality of the process, all the surfaces of the geometric details were coated with parylene.

With reference to FIG. 13A, vertical posts were created as follows. Starting with thermally oxidized silicon wafers (prime grade, (100) type, 400-500 μm thick), $SiO_2$ (~1 μm thick) was first patterned by photolithography and reactive ion etching (RIE). Using $SiO_2$ as hard mask, Si was anisotropically etched (~50 μm deep) by deep reactive ion etching (DRIE) followed by a buffered oxide etch (BOE) bath to remove the top $SiO_2$ ensuring there is no re-entrant feature caused by the $SiO_2$ mask. A ~150 nm-thick $C_4F_8$ was then coated to form a superhydrophobic surface.

With reference to FIG. 13B, re-entrant posts were created as follows. Starting with thermally oxidized silicon wafers (prime grade, (100) type, 400-500 μm thick), $SiO_2$ (~1 μm thick) was first patterned by photolithography and RIE. Using $SiO_2$ as hard mask, Si was anisotropically etched (~50 μm deep) by DRIE. The re-entrant topology was then exposed by an isotropic Si etching (5-8 μm). A ~150 nm-thick $C_4F_8$ was coated afterwards to form a superoleophobic surface. As noted, the vertical posts of FIG. 13A and the re-entrant posts of FIG. 13B were used for comparison purposes when testing the doubly re-entrant posts of FIG. 13C.

Figure 14A:
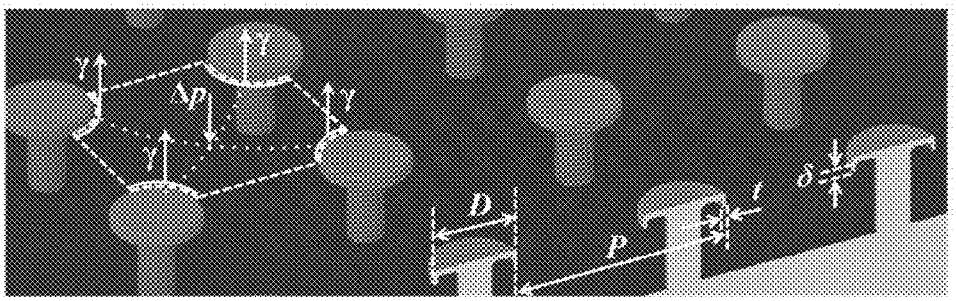
FIG. 14A illustrates a perspective view of a designed surface of microposts with doubly re-entrant terminal structures. The key geometric parameters include: D (the post top diameter or cap diameter); P (the center-to-center distance (i.e., pitch) between adjacent posts); $\delta$ and t are the length and thickness, respectively, of the downwardly extending lip.
Figure 14B:
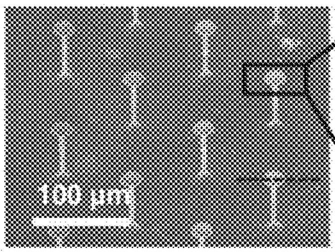
FIG. 14B illustrates an SEM micrograph of the fabricated $SiO_2$ surface with a top angled view of the square-array of circular posts with D~20 μm, P=100 μm, $\delta$~1.5 μm, and t~300 nm, resulting in $f_s$~5%.
Figure 14C:
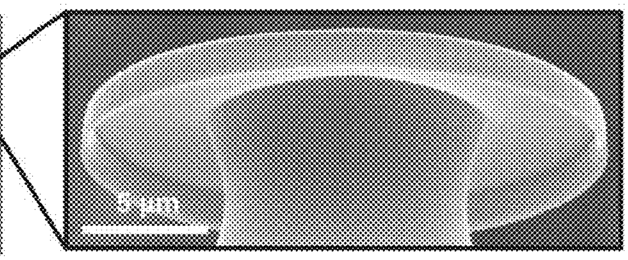
FIG. 14C illustrates a bottom angled view of a single post in FIG. 14B.
Figure 14D:
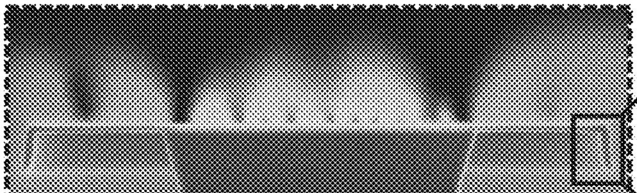
FIG. 14D illustrates a cross-sectional view of a single post in FIG. 14B.
Figure 14E:
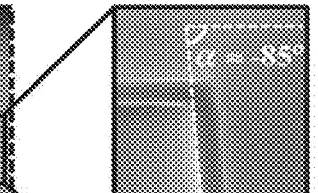
FIG. 14E illustrates a magnified, cross-sectional view of the downwardly extending lip. Note the angle of the lip ($\alpha=-85°$) is close to the ideal angle ($\alpha=-90°$).

FIGS. 14A-14E illustrates the design and fabricated results of the doubly re-entrant $SiO_2$ posts. FIG. 14A illustrates key geometric parameters: D is the post top diameter, P is the center-to-center distance (i.e., pitch) between adjacent posts, and δ and t are the length and thickness of the vertical overhang. ΔP indicates the pressure of the liquid with respect to the gas. To make $f_s$ small enough ($f_s$<6%), δ and t should be shrunk to extreme values. FIGS. 14B-14E illustrate various SEM micrograph images of the fabricated surface. FIG. 14B is a top angled view of the square-array of circular posts with D~20 μm, P=100 μm, δ~1.5 μm, and t~300 nm, resulting in $f_s$~5%. FIG. 14C is a bottom angled view of one post. FIG. 14D is a cross-sectional view of one post. FIG. 14E is a magnified cross-sectional view of the vertical overhang.

The inclined angle of the vertical overhang is measured to be ~−85±1° as seen in FIG. 14E, providing a maximum suspension force that is 99.6% of the perfectly vertical lips shown in FIGS. 6-8. To evaluate the liquid repellency, fourteen different liquids were chosen (Table 1 below) including water, ionic liquid, acid, oils, and numerous polar or non-polar organic or fluorinated solvents with surface tensions ranging from 72.8 mN/m (i.e., water) to the lowest known 10 mN/m (i.e., perfluorohexane or FC-72). A smooth $SiO_2$ surface was highly wetted ($\theta^*=\theta_Y<10°$) by all the liquids, as expected (Table 2 below). In contrast, the structured $SiO_2$ surface successfully suspended and repelled all of the tested liquids, beading them into Cassie state droplets and behaved superomniphobic in air.

TABLE 1

| Name | Chemical Formula | Surface Tension (mN/m) | Viscosity (mPa · s) | Boiling Point (° C.) | Vapor Pressure (Pa) | Density (kg/m³) |
|---|---|---|---|---|---|---|
| FC-72† | $C_6F_{14}$ | 10[25] | 0.64[25] | 56 | 30900 | 1680[25] |
| Novec 649‡ | $C_6F_9O$ | 10.8[25] | 0.64[25] | 49 | 40360 | 1600[25] |
| FC-84§ | $C_7F_{16}$ | 12[25] | 0.91[25] | 80 | 10600 | 1730[25] |
| Novec 7100‖ | $C_4F_9OCH_3$ | 13.6[25] | 0.58 | 61 | 26931 | 1520[25] |
| FC-40¶ | $C_{21}F_{48}N_2$ | 16[25] | 4.1[25] | 165 | 287 | 1855[25] |
| Hexane | $C_6H_{14}$ | 18.4 | 0.3 | 68 | 17300 | 660.6 |
| 2-Propanol | $C_3H_8O$ | 21.2 | 2.04 | 82 | 6020 | 780.9 |
| Methanol | $CH_4O$ | 22.5 | 0.544 | 65 | 16900 | 791.4 |
| Acetone | $C_3H_6O$ | 23.1 | 0.306 | 56 | 30800 | 784.5 |
| Toluene | $C_7H_8$ | 28.3 | 0.56 | 111 | 3790 | 866.8 |
| Formic acid | $CH_2O_2$ | 38.0 | 1.607 | 101 | 5973 | 1223 |
| Ethylene glycol | $C_2H_6O_2$ | 48.2 | 16.06 | 198 | 12.3 | 1113.5 |
| [EMIM][BF4]* | $C_6H_{11}BF_4N_2$ | 52.8 | 37 | >350 | ~0 | 1294[25] |
| Water | $H_2O$ | 72.8 | 0.89 | 100 | 3169 | 997 |

Note:
Properties are collected at 20° C. unless otherwise specified as superscript.
†FC-72 is also called perfluorohexane or tetradecafluorohexane.
‡Novec 649 is also called dodecafluoro-2-methylpentan-3-one.
§FC-84 is also called perfluoro-n-heptane.
‖Novec 7100 is also called methoxynonafluorobutane.
¶FC-40 is a mixture of perfluoro-tri-n-butylamine and perfluoro-di-n-butylmethylamine.
*[EMIM][$BF_4$] is also called 1-ethyl-3-methylimidazolium tetrafluoroborate.

TABLE 2

| Name | Surface Tension (mN/m) | θ on $SiO_2$ $\theta_A$ | θ on $SiO_2$ $\theta_R$ | θ on $C_4F_8$ $\theta_A$ | θ on $C_4F_8$ $\theta_R$ | θ* on doubly re-entrant $SiO_2$ $\theta^*_A$ | θ* on doubly re-entrant $SiO_2$ $\theta^*_R$ | θ* on re-entrant $C_4F_8$ $\theta^*_A$ | θ* on re-entrant $C_4F_8$ $\theta^*_R$ | θ* on vertical $C_4F_8$ $\theta^*_A$ | θ* on vertical $C_4F_8$ $\theta^*_R$ |
|---|---|---|---|---|---|---|---|---|---|---|---|
| FC-72 | 10[25] | <10 | <10 | <10 | <10 | 153.8 ± 2.2 | 133.0 ± 5.4 | 0 | 0 | 0 | 0 |
| Novec 649 | 10.8[25] | <10 | <10 | <10 | <10 | 156.2 ± 1.1 | 132.8 ± 3.6 | 0 | 0 | 0 | 0 |
| FC-84 | 12[25] | <10 | <10 | <10 | <10 | 155.4 ± 1.7 | 130.4 ± 5.4 | 0 | 0 | 0 | 0 |
| Novec 7100 | 13.6[25] | <10 | <10 | <10 | <10 | 156.9 ± 0.8 | 134.6 ± 2.9 | 0 | 0 | 0 | 0 |
| FC-40 | 16[25] | <10 | <10 | <10 | <10 | 155.4 ± 1.5 | 131.0 ± 3.8 | 0 | 0 | 0 | 0 |
| Hexane | 18.4 | <10 | <10 | 20.3 | <10 | 157.8 ± 0.7 | 136.1 ± 1.6 | 0 | 0 | 0 | 0 |
| 2-Propanol | 21.2 | <10 | <10 | 33.4 | <10 | 157.1 ± 1.3 | 136.1 ± 1.2 | 158.8 ± 0.8 | 138.4 ± 0.4 | 6.9 ± 0.8 | 0 |
| Methanol | 22.5 | <10 | <10 | 49.7 | 32.3 | 157.6 ± 1.1 | 137.3 ± 1.4 | 156.1 ± 0.7 | 138.3 ± 1.5 | 39.8 ± 0.9 | 0 |
| Acetone | 23.1 | <10 | <10 | 49.4 | 21.1 | 157.4 ± 0.9 | 136.2 ± 1.5 | 156.0 ± 2.1 | 137.2 ± 1.8 | 31.0 ± 2.0 | 0 |
| Toluene | 28.3 | <10 | <10 | 41.8 | 27.3 | 156.0 ± 0.7 | 134.9 ± 2.4 | 159.9 ± 0.5 | 136.6 ± 2.7 | 32.6 ± 1.7 | 4.8 ± 0.2 |
| Formic acid | 38 | <10 | <10 | 78.6 | 58.3 | 156.5 ± 1.2 | 135.9 ± 1.5 | 157.5 ± 1.2 | 137.6 ± 1.9 | 87.3 ± 1.6 | 43.5 ± 1.6 |
| Ethylene glycol | 48.2 | <10 | <10 | 96.2 | 52.5 | 156.3 ± 0.4 | 135.3 ± 1.0 | 159.4 ± 0.5 | 143.6 ± 0.9 | 158.0 ± 1.0 | 143.5 ± 1.2 |
| [EMIM][$BF_4$] | 52.8 | <10 | <10 | 96.3 | 72.9 | 156.9 ± 0.2 | 139.3 ± 1.2 | 156.2 ± 0.4 | 141.4 ± 1.5 | 153.4 ± 1.1 | 138.3 ± 4.2 |
| Water | 72.8 | <10 | <10 | 120.5 | 91.5 | 157.3 ± 0.7 | 138.9 ± 0.9 | 157.5 ± 0.5 | 146.3 ± 1.1 | 157.8 ± 0.5 | 148.2 ± 0.7 |

Figure 15:
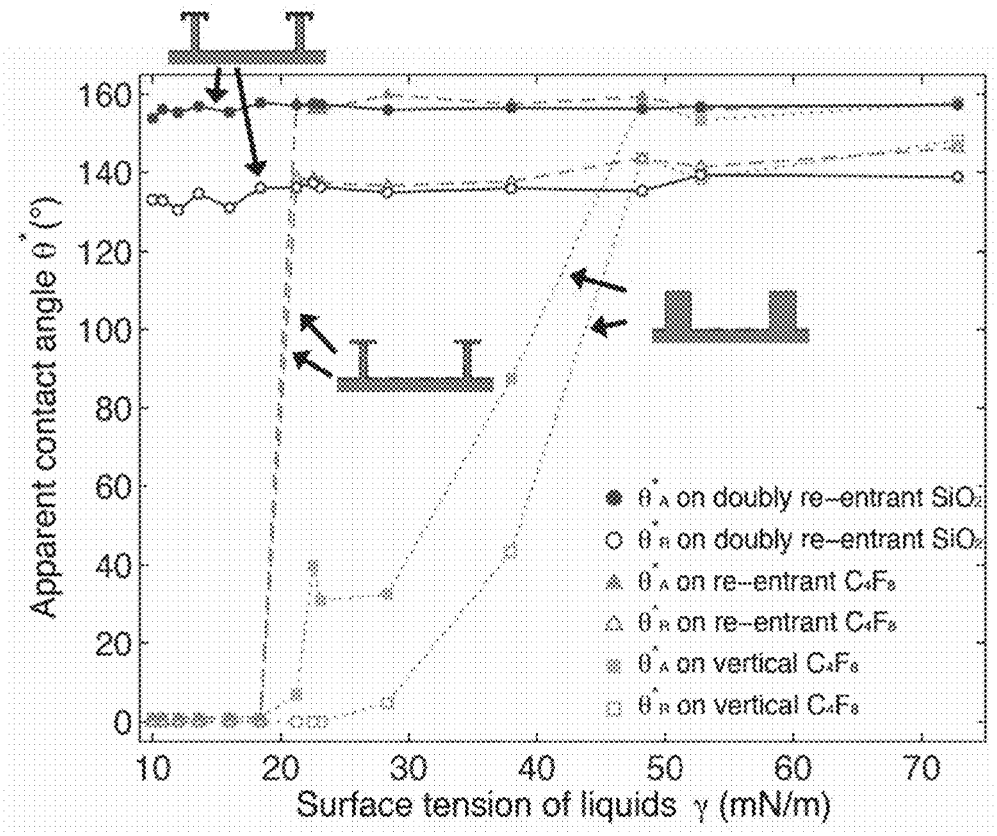
FIG. 15 illustrates apparent advancing and receding contact angles of the fourteen (14) liquids measured on three liquid-repellent surfaces—the prepared omniphobic surface with the doubly re-entrant terminal structures and two control surfaces (re-entrant and vertical) of the same nominal solid fraction ($f_s$~5%). Data on the omniphobic surface are depicted in circles (solid and hollow). Data on the control surface with re-entrant and vertical topologies are depicted in triangles and squares, respectively.

To quantify the repellency of the surface, the advancing and receding contact angles were measured (FIG. 15) and roll-off angles of all fourteen liquids. FIG. 15 also includes the other two liquid-repellent surfaces analyzed for comparison purposes: a superhydrophobic surface consisting of cylindrical posts (FIG. 13A) and a superoleophobic surface consisting of posts with re-entrant overhangs (FIG. 13B), both of which were coated with a hydrophobic layer of $C_4F_8$. Each data point is an average of over 100 measurements. The error bars are omitted in FIG. 15 for clarity. As expected, while the superhydrophobic surface with vertical posts could not suspend liquids with surface tension below ~40 mN/m, the superoleophobic surface with re-entrant posts repelled liquids with lower surface tension (20-40 mN/m). However, liquids with even lower surface tension (<20 mN/m) could not be suspended as they wicked between the re-entrant posts. In contrast, on the surface with doubly re-entrant posts, all fourteen liquids formed large contact angles even without any hydrophobic coating.

Figure 16:
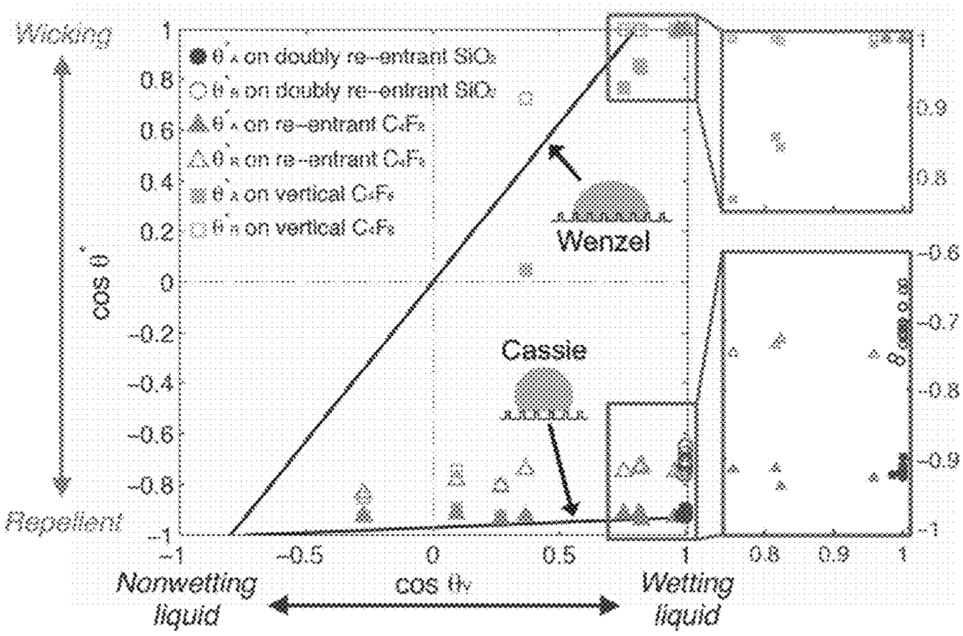
FIG. 16 illustrates the relation of contact angles on smooth surface ($\cos\theta_Y$) and on a structured surface ($\cos\theta^*$). The theoretical relations from Wenzel and Cassie-Baxter models are plotted in solid lines. Data near (1,−1) and (1,1) are shown in the magnified boxes, revealing the difference between the structured $SiO_2$ surface with the control surfaces, especially when liquids highly wet the material.

The extent to which wettability is modulated by surface roughness is shown in FIG. 16 where the apparent wettability (i.e., cos θ*) is plotted as a function of the inherent wettability (i.e., cos $\theta_Y$). Data from the doubly re-entrant posts surface (i.e., circles) were populated at the lower right corner in the fourth quadrant near point (1,−1), exhibiting the exceptional ability to render a highly wettable material super-repellent. In contrast, while the two control surfaces permit a Cassie state with non-wettable or partially wettable material, they got soaked when the material was highly wetted by the liquids of very low surface tension (i.e., hexane and six fluorinated solvents), displaying θ*~0° with data populated near point (1,1).

Figure 17:
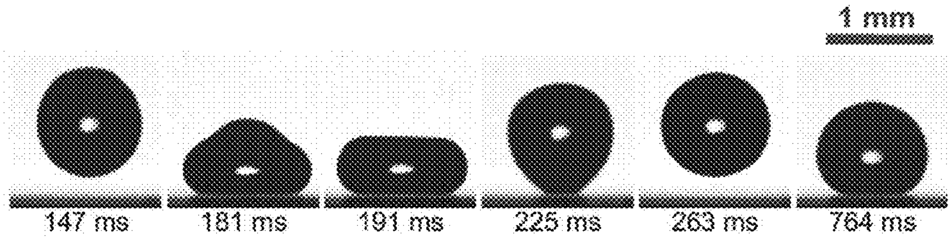
FIG. 17 illustrates a series of image frames from a movie illustrating the repellency of the structured $SiO_2$ surface by a droplet of perfluorohexane (i.e., 3M™ FC-72) bouncing off the omniphobic $SiO_2$ surface with doubly re-entrant posts of D~10 μm, P=50 μm, δ~920 nm, t~270 nm, and $f_s$~5% under Weber number We~0.42.

In addition to repelling all fourteen liquids, the superomniphobic surfaces are also expected to sustain static and dynamic pressures better than the existing superhydrophobic and superoleophobic surfaces. The doubly re-entrant structures allow droplets to bounce on even extremely sparse posts (i.e., tens of micrometers pitch and a solid fraction only ~5%). With high-speed imaging, water, methanol and FC-72 droplets were confirmed to bounce off the truly superomniphobic SiO2 surfaces. Water (γ=72.8 mN/m) and methanol (γ=22.5 mN/m) droplets rebounded on a surface with microposts of 100 μm pitch, which is much larger than those reported in the literature. However, FC-72 (γ=10 mN/m) droplets penetrated and wetted the above surface at impact. A surface with uniformly halved structures (i.e., $f_s$ remaining at ~5%) was further prepared to provide enough resistance against impalement and let FC-72 droplets rebound, as shown with snapshots in FIG. 17.

Figure 18:
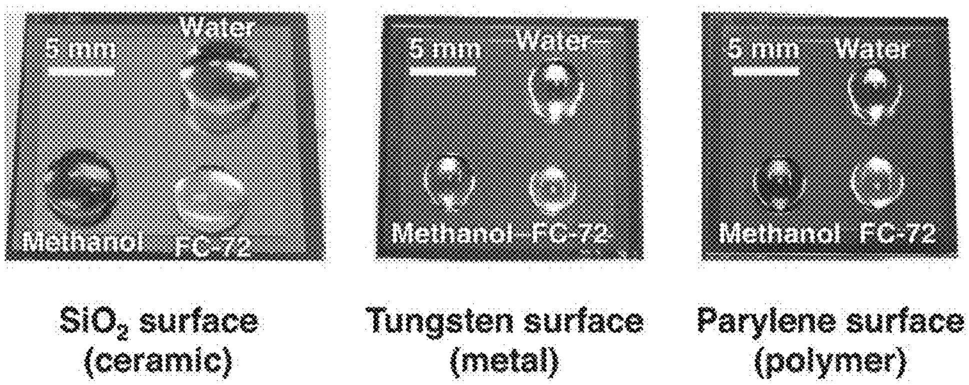
FIG. 18 illustrates photographic images of three identically structured omniphobic surfaces ($SiO_2$ surface, tungsten surface, parylene surface) with droplets of water, methanol, and perfluorohexane (i.e., 3M™ FC-72) beading and rolling.
Figure 19:
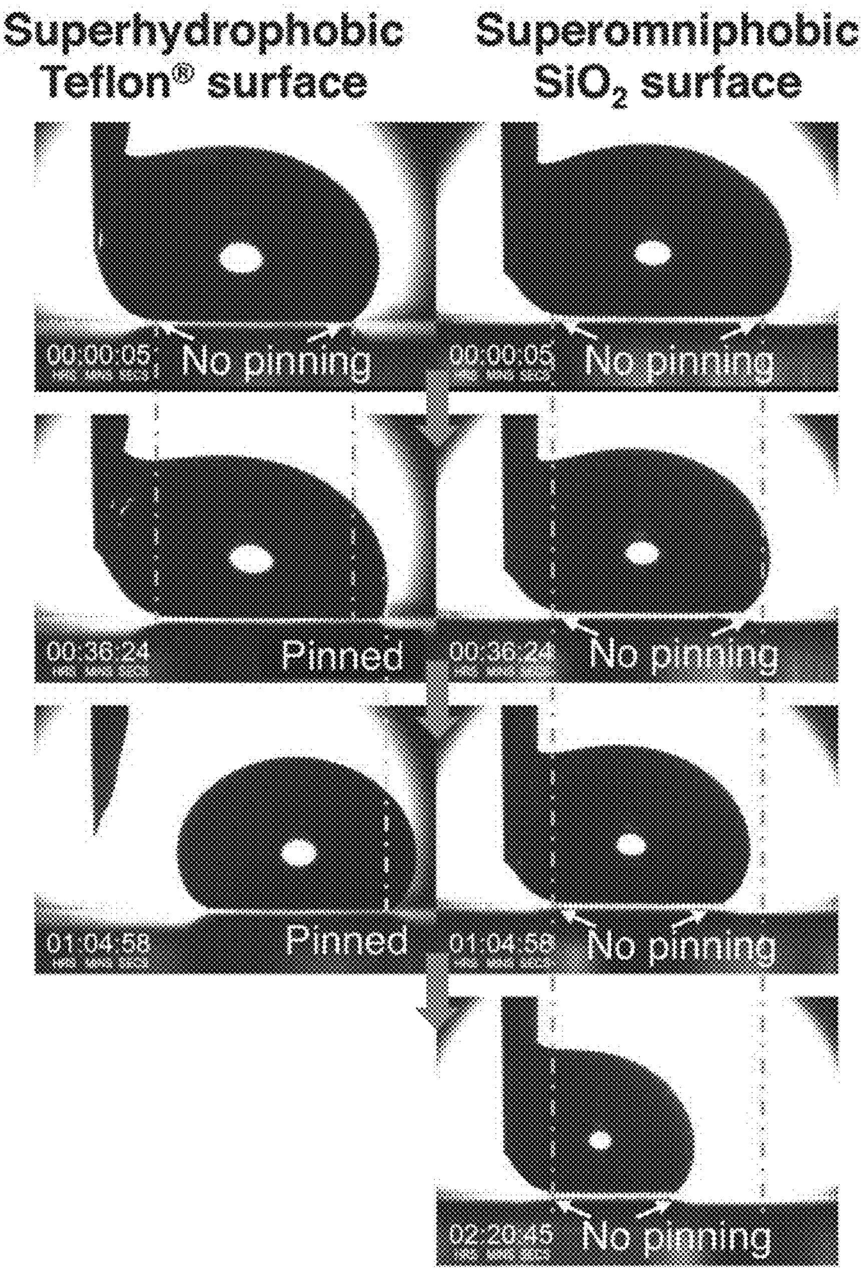
FIG. 19 illustrates a series of captured image frames from a movie demonstrating the long-term compatibility of superomniphobic $SiO_2$ surface with biological fluids. In the images in the left column, a Teflon®-coated superhydrophobic surface was used as the control surface. A serum droplet stuck to the surface after ~36 minutes (manifested by the stretched droplet and increased contact diameter) and eventually detached from the needle due to the pinning and shrinkage. The right column illustrates the same test on the superomniphobic $SiO_2$ surface. In contrast to the control surface, on the superomniphobic $SiO_2$ surface, the serum droplet continued to slide without pinning and stayed attached to the needle while shrinking. To assure a fair comparison, two surfaces with identical solid fractions were used.

Since the proposed super-repellency depends only on physical attributes, fabricated metal (i.e., tungsten) and polymer (i.e., parylene) counterparts were fabricated based on the given $SiO_2$ surface and confirmed that they possess the same super-repellency as expected (FIG. 18). The ability to repel fluorinated solvents may allow the electronic circuits to be cooled by nucleate boiling (i.e., the most efficient mode of cooling) for supercomputers. Free of polymeric coating, the superomniphobic $SiO_2$ surface can serve at high temperatures. The surface was found unaltered after a storage at >1000° C. and used to demonstrate rolling-off of another FC liquid at 150° C. and a non-volatile liquid at >320° C. The polymer-free parts are expected to last longer in outdoor environment, where polymeric materials tend to degrade faster. Unaffected by the surface chemistry, the superomniphobic $SiO_2$ surface also demonstrated prolonged repellency to biological fluids (sheep serum tested), while a regular superhydrophobic surface lost the repellency (FIG. 19).

The surfaces described herein may, in some embodiments, be applied to other structures or surfaces. For example, the microstructures 12 may be made onto polymer films, tapes, or other flexible structures that can applied or adhered to an existing surface to make that surface repellent to liquids. For example, such a surface application may be used to prevent chemical contact to critical operating components or infrastructure. In still other applications, such surfaces can be used to reduce or eliminate surface changing phenomenon such as biofouling, scaling, corrosion, and the like. For example, the surface could be applied to or integrated in a water vessel, submersible structure, chemical container, liquid pipeline, biomedical instrument or the like.

The surface may be used for phase-change heat transfer. For example, the surface may be used as nucleation spots in boiling heat transfer for electronic thermal management solutions using refrigerants (e.g., fluorinated solvents like those available from 3M™). As another example, the surface may be used as nucleation spots for condensation when the top surface is controlled colder than the cavity and may find application in power plant condenser promoting dropwise condensation of hot steams.

The surfaces made with a gradient of liquid-solid fraction may find application in liquid collection, separation, transportation, etc. For example, water droplets can be collected and transport towards less hydrophobic (i.e. more hydrophilic) spots in space with no gravity; oil and water, immiscible organic and fluorinated solvents can be separated by the surface when it is made permeable and with proper solid fraction $f_s$ such that one liquid wets and penetrates while the other is repellent and stay suspended.

While embodiments of the present invention have been shown and described, various modifications may be made without departing from the scope of the present invention. The invention, therefore, should not be limited, except to the following claims, and their equivalents.

What is claimed is:

1. A liquid-repellent artificial surface comprising:

a surface containing thereon a plurality of microstructures extending away from the surface and separated by a pitch of less than 500 μm and having a doubly re-entrant topology situated atop respective base structures with a liquid disposed on the surface and in contact with the plurality of microstructures and a liquid-solid contact fraction ($f_s$) of less than 50%, wherein the doubly re-entrant topology comprises a cap portion and downwardly extending lip extending from a periphery of the cap portion, the downwardly extending lip comprising a substantially uniform thickness.

2. The liquid-repellent surface of claim 1, wherein the downwardly extending lip has a thickness adjacent to a tip of the lip of less than 10% of the width of the cap portion and a length less than 10% of the width of the cap portion.

3. The liquid-repellent surface of claim 1, wherein the downwardly extending lip is angled (α) with respect to a plane of the surface within the range of −30° to −180°.

4. The liquid-repellent surface of claim 1, wherein the downwardly extending lip extends downward for a length of less than 10 μm.

5. The liquid-repellent surface of claim 1, wherein the downwardly extending lip has a maximum thickness of 5 μm.

6. The liquid-repellent surface of claim 1, wherein the thickness of the cap portion is substantially equal to the thickness of the downwardly extending lip.

7. The liquid-repellent surface of claim 1, wherein the liquid-solid contact fraction ($f_s$) is less than 6%.

8. The liquid-repellent surface of claim 1, wherein the surface comprises one of a ceramic, a metal, and a polymer.

9. The liquid-repellent surface of claim 1, wherein the microstructures comprise one of posts, grating lines, and closed cells.

10. The liquid-repellent surface of claim 1, wherein the liquid disposed on the surface has a surface tension smaller than 0.018 N/m, and wherein the liquid disposed on the surface beads on the surface.

11. The liquid-repellent surface of claim 7, wherein the liquid disposed on the surface has a surface tension smaller than 0.018 N/m, and wherein the liquid disposed on the surface rolls on the surface.

12. The liquid-repellent surface of claim 7, wherein the liquid disposed on the surface has a surface tension smaller than 0.018 N/m, and wherein the liquid disposed on the surface bounces on the surface.

13. The liquid-repellent surface of claim 1, wherein the surface containing thereon a plurality of microstructures is formed as a polymer film or tape.

14. The liquid-repellent surface of claim 1, wherein the surface exhibits anti-fouling properties.

15. The liquid-repellent surface of claim 14, wherein the surface exhibits anti-biofouling properties.

16. The liquid-repellent surface of claim 1, wherein the surface is polymer free and retains its repellent properties when exposed to a temperature above 300° C.

17. The liquid-repellent surface of claim 1, wherein the surface is coated with another material thinner than the downwardly extending lip.

18. The liquid-repellent surface of claim 1, wherein the downwardly extending lip comprises a region of artificially induced stress.

* * * * *